(12) United States Patent
Schabes et al.

(10) Patent No.: US 7,243,305 B2
(45) Date of Patent: Jul. 10, 2007

(54) SPELLING AND GRAMMAR CHECKING SYSTEM

(75) Inventors: Yves Schabes, Boston, MA (US); Emmanuel Roche, Belmont, MA (US)

(73) Assignee: Global Information Research and Technologies LLC, Cambridge, MA (US)

( * ) Notice: Subject to any disclaimer, the term of this patent is extended or adjusted under 35 U.S.C. 154(b) by 565 days.

(21) Appl. No.: 10/153,460

(22) Filed: May 22, 2002

(65) Prior Publication Data

US 2004/0093567 A1 May 13, 2004

Related U.S. Application Data

(63) Continuation of application No. 09/084,535, filed on May 26, 1998, now Pat. No. 6,424,983.

(51) Int. Cl.
*G06F 15/00* (2006.01)
*G06F 17/00* (2006.01)

(52) U.S. Cl. .............................. 715/533; 707/5; 707/10; 704/8; 704/9

(58) Field of Classification Search ................ 715/533; 707/5, 9, 10; 704/9, 8
See application file for complete search history.

(56) References Cited

U.S. PATENT DOCUMENTS 5,369,577 A * 11/1994 Kadashevich et al. ......... 704/9
5,485,372 A * 1/1996 Golding et al. ................ 704/9
5,606,690 A * 2/1997 Hunter et al. .................. 707/5
5,625,554 A * 4/1997 Cutting et al. .............. 707/100
5,677,835 A * 10/1997 Carbonell et al. ............. 704/8

OTHER PUBLICATIONS

Microsoft Word 97 SR-2, 1997 Microsoft Corporation, software application screen shots pp. 1-18.*
Associative Computing, Inc. Releases Two Intelligent Keyword Search Enhancement Tools at Fall Internet World 97, Press Release—Archive, Dec. 12, 1997, <HTTP://www.mindmaker.com/html/news/pr_December_12_1997.html>, pp. 1-2.*

* cited by examiner

*Primary Examiner*—William Bashore
(74) *Attorney, Agent, or Firm*—Sam Pasternack; Choate Hall & Stewart, LLP

(57) ABSTRACT

System of correcting misspelled words in input text detects a misspelled word in the input text, determines a list of alternative words for the misspelled word, and ranks the list of alternative words based on a context of the input text. In certain embodiments, finite state machines (FSMs) are utilized in the spelling and grammar correction process, storing one or more lexicon FSMs, each of which represents a set of correctly spelled reference words. Storing the lexicon as one or more FSMs facilitates those embodiments of the invention employing a clinet-server architecture. The input text to be corrected may also be encoded as a FSM, which includes alternative word(s) for word(s) in need of correction along with associated weights. The invention adjusts the weights by taking into account the grammatical context in which the word appears in the input text. In certain embodiments the modification is performed by applying a second FSM to the FSM that was generated for the input text, where the second FSM encodes a grammatically correct sequence of words, thereby generating an additional FSM.

8 Claims, 20 Drawing Sheets

SPELLING AND GRAMMAR CHECKING SYSTEM

This application is a continuation of and claims priority to U.S. patent application Ser. No. 09/084,535, filed May 26, 1998 now U.S. Pat. No. 6,424,983, the contents of which are hereby incorporated by reference in their entirety.

REFERENCE TO COMPUTER PROGRAM LISTING APPENDIX

This application refers to material comprising a portion of a computer program listing presented as an appendix on CD. The file on the accompanying CD entitled "Appendix for Spelling and Grammar Checking System.doc", created May 8, 2001, size 80,384 bytes, on the CD is incorporated herein by reference. The file includes three appendices, entitled "Appendix A", "Appendix B", and "Appendix C".

BACKGROUND OF THE INVENTION

1. Field of the Invention

The present invention relates generally to a spelling and grammar checking system, and more particularly to a spelling and grammar checking system which corrects misspelled words, incorrectly-used words, and contextual and grammatical errors. The invention has particular utility in connection with machine translation systems, word processing systems, and text indexing and retrieval systems such as World Wide Web search engines.

2. Description of the Related Art

Conventional spelling correction systems, such as those found in most common word processing applications, check whether each word in a document is found in a dictionary database. When a word is not found in the dictionary, the word is flagged as being incorrectly spelled. Suggestions for replacing the incorrectly-spelled word with its correctly-spelled counterpart are then determined by inserting, deleting and/or transposing characters in the misspelled word. For example, in a sentence like My son thre a ball at me, the word thre is not correctly-spelled. Conventional spelling correction systems, such as those described in U.S. Pat. No. 4,580,241 (Kucera) and U.S. Pat. No. 4,730,269 (Kucera), suggest words such as threw, three, there and the, as possible alternatives for the misspelled word by adding and deleting characters at different locations in the misspelled word. These alternative words are then displayed to a user, who must then select one of the alternatives.

One of the drawbacks of conventional systems is that they lack the ability to suggest alternative words based on the context in which the misspelled word appears. For example, in the following three sentences, the word thre appears in different contexts and, therefore, should be corrected differently in each sentence.

My son thre a ball through the window.

He broke thre window.

He moved thre years ago.

More specifically, in the first sentence, the incorrectly-spelled word thre should be replaced by threw. In the second sentence, the word thre should be replaced by the. In the third sentence, the word thre should be replaced by three. In spite of these differences in context, conventional spelling correction systems suggest the same list of alternative words, ranked in the same order, for all three of the foregoing sentences. For example, the spelling correction program provided in Microsoft® Word '97 suggests the following words, in the following order, for all three of the foregoing sentences: three, there, the, throe, threw.

Since conventional spelling correction systems do not rank alternative words according to context, such systems are not able to correct spelling mistakes automatically, since to do so often leads to an inordinate number of incorrectly corrected words. Rather, such systems typically use an interactive approach to correcting misspelled words. While such an approach can be effective, it is inefficient, and oftentimes very slow, particularly when large documents are involved. Accordingly, there exists a need for a spell checking system which is capable of ranking alternative words according to context, and which is also capable of automatically correcting misspelled words without significant user intervention.

Conventional spelling correction systems are also unable to correct grammatical errors in a document or other input text, particularly if those words are spelled correctly but are misused in context. By way of example, although the word too is misused in the sentence He would like too go home, conventional spelling correction systems would not change too to to, since too is correctly spelled. In this regard, grammar checking systems are available which correct improperly used words (see, e.g., U.S. Pat. No. 4,674,065 (Lange), U.S. Pat. No. 5,258,909 (Damerau), U.S. Pat. No. 5,537,317 (Schabes), U.S. Pat. No. 4,672,571 (Bass), and U.S. Pat. No. 4,847,766 (McRae)). Such systems, however, are of limited use, since they are only capable of correcting relatively short lists of predefined words. More importantly, such systems are not capable of performing grammar corrections on words that have been misspelled.

Accordingly, there exists a need for a spelling and grammar checking system which is capable of correcting words that have misused in a given context in cases where the words have been spelled incorrectly and in cases where the words have been spelled correctly.

SUMMARY OF THE INVENTION

The present invention addresses the foregoing needs by providing a system which corrects both the spelling and grammar of words using finite state machines, such as finite state transducers and finite state automata. For each word in a text sequence, the present invention provides a list of alternative words ranked according to a context of the text sequence, and then uses this list to correct words in the text (either interactively or automatically). The invention has a variety of uses, and is of particular use in the fields of word processing, machine translation, text indexing and retrieval, and optical character recognition, to name a few.

In brief, the present invention determines alternatives for misspelled words, and ranks these alternatives based on a context in which the misspelled word occurs. For example, for the sentence My son thre a ball through the window, the present invention suggests the word threw as the best correction for the word thre, whereas for the sentence He broke thre window, the present invention suggests the word the as the best correction for the word thre. In its interactive mode, the invention displays alternative word suggestions to a user and then corrects misspelled words in response to a user's selection of an alternative word. In contrast, in its automatic mode, the present invention determines, on its own, which of the alternatives should be used, and then implements any necessary corrections automatically (i.e., without user input).

Advantageously, the invention also addresses incorrect word usage in the same manner that it addresses misspelled words. Thus, the invention can be used to correct improper use of commonly-confused words such as who and whom, homophones such as then and than, and other such words that are spelled correctly, but that are improper in context. For example, the invention will correct the sentence He thre the ball to the sentence He threw the ball (and not three, the, . . . ); the sentence fragment flight simulator to flight simulator (and not stimulator); the sentence fragment air baze to air base (and not baize, bass, babe, or bade); the phrase Thre Miles Island to Three Miles Island (and not The or Threw); and the phrase ar traffic controller to air traffic controller (and not are, arc, . . . ). The invention also can be used to restore accents (such as á, à, é, . . . ) or diacritic marks (such as ñ, ç, . . . ) in languages such as French and Spanish. For example, the current invention corrects the sentence il l'a releve to il l'a relevé (and not relève, relèvent, . . . ).

According to one aspect, the present invention is a system (i.e., an apparatus, a method and/or computer-executable process steps) for correcting misspelled words in input text. The system detects a misspelled word in the input text, and determines a list of alternative words for the misspelled word. The list of alternative words is then ranked based on a context of the input text.

According to another aspect, the present invention is a word processing system for creating and editing text documents. The word processing system inputs text into a text document, spell-checks the text so as to replace misspelled words in the text with correctly-spelled words, and outputs the document. The spell-checking performed by the system comprises detecting misspelled words in the text, and, for each misspelled word, determining a list of alternative words for the misspelled word, ranking the list of alternative words based on a context in the text, selecting one of the alternative words from the list, and replacing the misspelled word in the text with the selected one of the alternative words.

According to another aspect, the present invention is a machine translation system for translating text from a first language into a second language. The machine translation system inputs text in the first language, spell-checks the text in the first language so as to replace misspelled words in the text with correctly-spelled words, translates the text from the first language into the second language, and outputs translated text. The spell-checking performed by the system comprises detecting misspelled words in the text, and, for each misspelled word, determining a list of alternative words for the misspelled word, ranking the list of alternative words based on a context in the text, selecting one of the alternative words from the list, and replacing the misspelled word in the document with the selected one of the alternative words.

According to another aspect, the present invention is a machine translation system for translating text from a first language into a second language. The machine translation system inputs text in the first language, translates the text from the first language into the second language, spell-checks the text in the second language so as to replace misspelled words in the text with correctly-spelled words, and outputs the text. The spell-checking performed by the system comprises detecting misspelled words in the text, and, for each misspelled word, determining a list of alternative words for the misspelled word, ranking the list of alternative words based on a context in the text, selecting one of the alternative words from the list, and replacing the misspelled word in the document with the selected one of the alternative words.

According to another aspect, the present invention is an optical character recognition system for recognizing input character images. The optical character recognition system inputs a document image, parses character images from the document image, performs recognition processing on parsed character images so as to produce document text, spell-checks the document text so as to replace misspelled words in the document text with correctly-spelled words, and outputs the document text. The spell-checking performed by the system comprises detecting misspelled words in the document text, and, for each misspelled word, determining a list of alternative words for the misspelled word, ranking the list of alternative words based on a context in the text, selecting one of the alternative words from the list, and replacing the misspelled word in the document text with the selected one of the alternative words.

According to another aspect, the present invention is a system for retrieving text from a source. The system inputs a search word, corrects a spelling of the search word to produce a corrected search word, and retrieves text from the source that includes the corrected search word.

According to another aspect, the present invention is a system for retrieving text from a source. The system inputs a search phrase comprised of a plurality of words, at least one of the plurality of words being an incorrect word, and replaces the incorrect word in the search phrase with a corrected word in order to produce a corrected search phrase. Text is then retrieved from the source based on the corrected search phrase.

According to another aspect, the present invention is a system for correcting misspelled words in input text sequences received from a plurality of different clients. The system stores, in a memory on a server, a lexicon comprised of a plurality of reference words, and receives the input text sequences from the plurality of different clients. The system then spell-checks the input text sequences using the reference words in the lexicon, and outputs spell-checked text sequences to the plurality of different clients.

According to another aspect, the present invention is a system for selecting a replacement word for an input word in a phrase. The system determines alternative words for the input word, the alternative words including at least one compound word which is comprised of two or more separate words, each alternative word having a rank associated therewith. The system then selects, as the replacement word, an alternative word having a highest rank.

According to another aspect, the present invention is a system for correcting grammatical errors in input text. The system generates a first finite state machine ("FSM") for the input text, the first finite state machine including alternative words for at least one word in the input text and a rank associated with each alternative word, and adjusts the ranks in the first FSM in accordance with one or more of a plurality of predetermined grammatical rules. The system then determines which of the alternative words is grammatically correct based on the ranks associated with the alternative words, and replaces the at least one word in the input text with a grammatically-correct alternative word determined in the determining step.

According to another aspect, the present invention is a word processing system for creating and editing text documents. The word processing system inputs text into a text document, checks the document for grammatically-incorrect words, replaces grammatically-incorrect words in the document with grammatically-correct words, and outputs the document. The checking performed by the system comprises (i) generating a finite state machine ("FSM") for text in the text document, the finite state machine including alternative words for at least one word in the text and a rank associated with each alternative word, (ii) adjusting the ranks in the FSM in accordance with one or more of a plurality of predetermined grammatical rules, and (iii) determining which of the alternative words is grammatically correct based on ranks for the alternative words.

According to another aspect, the present invention is a machine translation system for translating text from a first language into a second language. The machine translation system inputs text in the first language, checks the text in the first language for grammatically-incorrect words, and replaces grammatically-incorrect words in the text with grammatically-correct words. The machine translation system then translates the text with the grammatically-correct words from the first language into the second language, and outputs the text in the second language. The checking performed by the machine translation system comprises (i) generating a finite state machine ("FSM") for the text in the first language, the finite state machine including alternative words for at least one word in the text and a rank associated with each alternative word, (ii) adjusting the ranks in the FSM in accordance with one or more of a plurality of predetermined grammatical rules, and (iii) determining which of the alternative words is grammatically correct based on ranks for the alternative words.

According to another aspect, the present invention is a machine translation system for translating text from a first language into a second language. The machine translation system inputs text in the first language, translates the text from the first language into the second language, checks the text in the second language for grammatically-incorrect words, replaces grammatically-incorrect words in the text with grammatically-correct words, and outputs the text with the grammatically-correct words. The checking performed by the system comprises (i) generating a finite state machine ("FSM") for the text in the second language, the finite state machine including alternative words for at least one word in the text and a rank associated with each alternative word, (ii) adjusting the ranks in the FSM in accordance with one or more of a plurality of predetermined grammatical rules, and (iii) determining which of the alternative words is grammatically correct based on ranks for the alternative words.

According to another aspect, the present invention is an optical character recognition system for recognizing input character images. The optical character recognition system inputs a document image, parses character images from the document image, performs recognition processing on parsed character images so as to produce document text, checks the document text for grammatically-incorrect words, replaces grammatically-incorrect words in the document text with grammatically correct words, and outputs the document text. The checking performed by the system comprises (i) generating a finite state machine ("FSM") for the document text, the finite state machine including alternative words for at least one word in the text and a rank associated with each alternative word, (ii) adjusting the ranks in the FSM in accordance with one or more of a plurality of predetermined grammatical rules, and (iii) determining which of the alternative words is grammatically correct based on ranks for the alternative words.

According to another aspect, the present invention is a system for retrieving text from a source. The system inputs a search phrase comprised of a plurality of words, at least one of the plurality of words being a grammatically-incorrect word, replaces the grammatically-incorrect word in the search phrase with a grammatically-correct word in order to produce a corrected search phrase, and retrieves text from the source based on the corrected search phrase.

According to another aspect, the present invention is a system of spell-checking input text. The system detects a misspelled word in the input text, stores one or more lexicon finite state machines ("FSM") in a memory, each of the lexicon FSMs including plural reference words, generates an input FSM for the misspelled word, selects one or more reference words from the lexicon FSMs based on the input FSM, the one or more reference words substantially corresponding to a spelling of the misspelled word, and outputs selected ones of the one or more reference words.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF CERTAIN PREFERRED EMBODIMENTS

Figure 1:
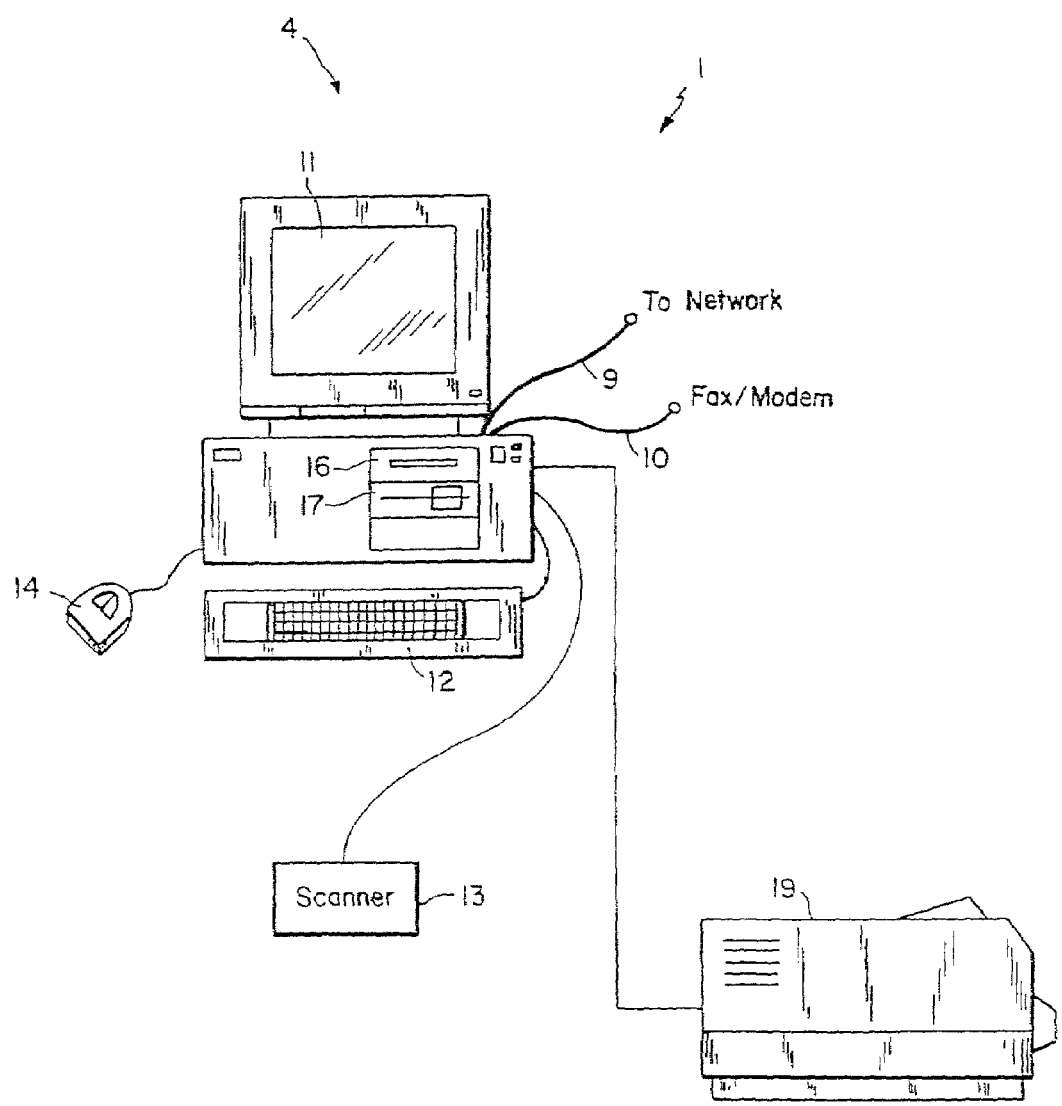
FIG. 1 shows representative computer-hardware on which the spelling and grammar checking system of the present invention may be executed.

FIG. 1 shows a representative embodiment of a computer system on which the present invention may be implemented. As shown in FIG. 1, PC 4 includes network connection 9 for interfacing to a network, such as a local area network ("LAN") or the World Wide Web (hereinafter "WWW"), and fax/modem connection 10 for interfacing with other remote sources. PC 4 also includes display screen 11 for displaying information to a user, keyboard 12 for inputting text and user commands, mouse 14 for positioning a cursor on display screen 11 and for inputting user commands, disk drive 16 for reading from and writing to floppy disks installed therein, and CD-ROM drive 17 for accessing information stored on CD-ROM. PC 4 may also have one or more peripheral devices attached thereto, such as scanner 13 for inputting document text images, graphics images, or the like, and printer 19 for outputting images, text, or the like.

Figure 2:
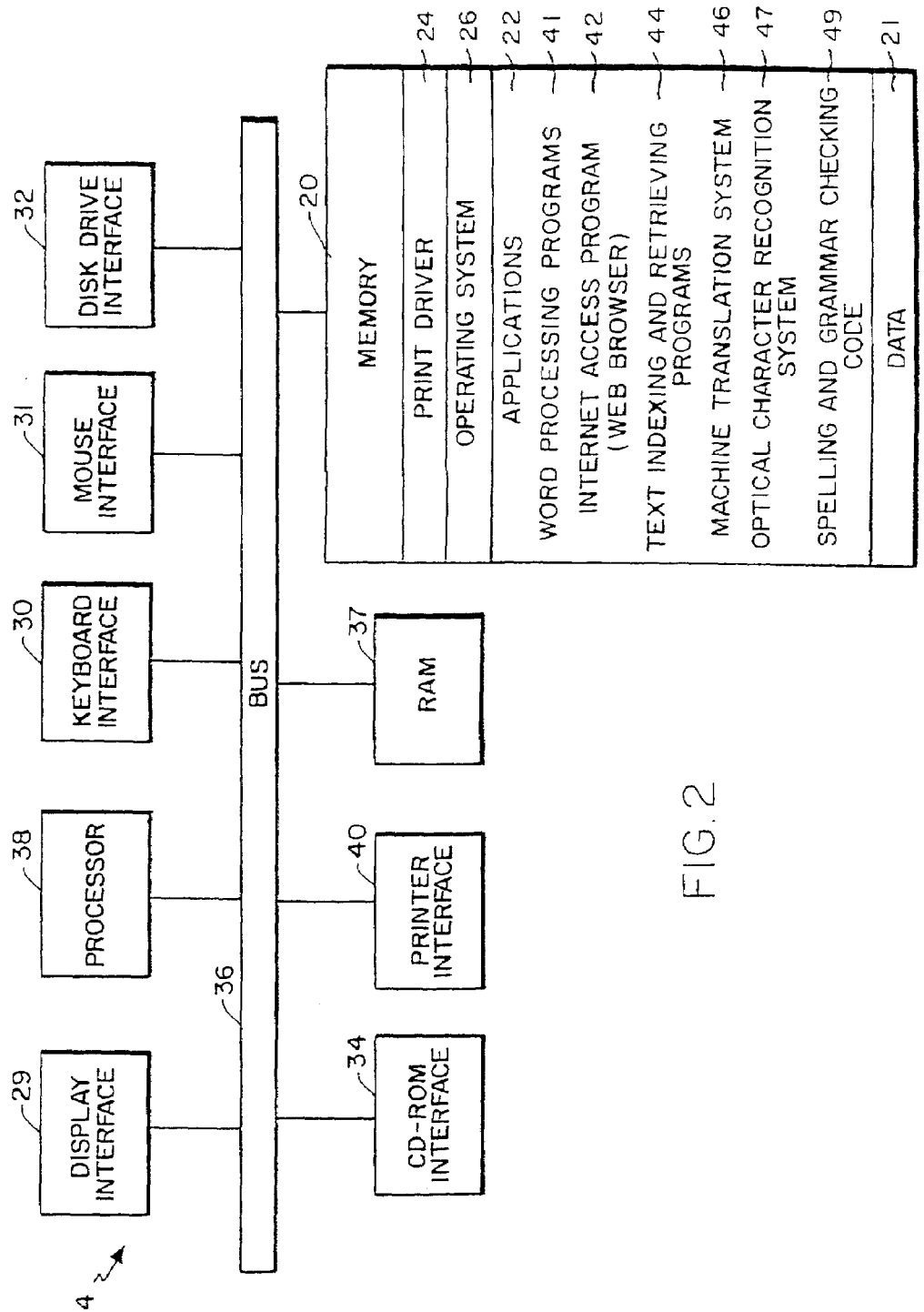
FIG. 2 shows the internal construction of the hardware shown in FIG. 1.

FIG. 2 shows the internal structure of PC 4. As shown in FIG. 2, PC 4 includes memory 20, which comprises a computer-readable medium such as a computer hard disk. Memory 20 stores data 21, applications 22, print driver 24, and an operating system 26. In preferred embodiments of the invention, operating system 26 is a windowing operating system, such as Microsoft® Windows95; although the invention may be used with other operating systems as well. Among the applications stored in memory 20 are word processing programs 41, such as WordPerfect® and Microsoft® Word '97; Internet access program 42 (i.e., a web browser), such as Netscape®, which includes one or more search engines, such as Infoseek, Lycos, Yahoo!, Excite, AOL NetFind, HotBot, LookSmart, Snap!, and WebCrawler; other text indexing and retrieving programs 44, such as such as programs for accessing Lexis®-Nexis® and Westlaw® databases; machine translation system 46, such as Professional by Systran®, which translates words and/or documents retrieved, e.g., from the WWW, from one language (e.g., French) to another language (e.g., English); and optical character recognition ("hereinafter "OCR") system 47 for recognizing characters from scanned-in documents or the like. Other applications may be stored in memory 20 as well. Among these other applications is spelling and grammar checking code 49 which comprises computer-executable process steps for performing contextual spelling and grammatical correction in the manner set forth in detail below.

Also included in PC 4 are display interface 29, keyboard interface 30, mouse interface 31, disk drive interface 32, CD-ROM drive interface 34, computer bus 36, RAM 37, processor 38, and printer interface 40. Processor 38 preferably comprises a microprocessor or the like for executing applications, such those noted above, out of RAM 37. Such applications, including spelling and grammar checking code 49 of the present invention, may be stored in memory 20 (as noted above) or, alternatively, on a floppy disk in disk drive 16 or a CD-ROM in CD-ROM drive 17. In this regard, processor 38 accesses applications (or other data) stored on a floppy disk via disk drive interface 32 and accesses applications (or other data) stored on a CD-ROM via CD-ROM drive interface 34.

Application execution and other tasks of PC 4 may be initiated using keyboard 12 or mouse 14, commands from which are transmitted to processor 38 via keyboard interface 30 and mouse interface 31, respectively. Output results from applications running on PC 4 may be processed by display interface 29 and then displayed to a user on display 11. To this end, display interface 29 preferably comprises a display processor for forming images based on data provided by processor 38 over computer bus 36, and for outputting those images to display 11. Output results from applications, such spelling and grammar checking code 49, running on PC 4 may also be provided to printer 19 via printer interface 40. In this case, processor 38 also executes print driver 24 so as to perform appropriate formatting of the output results prior to their transmission to printer 19.

Turning to spelling and grammar checking code 49, this code is comprised of computer-executable process steps for, among other things, detecting a misspelled word in input text, determining a list of alternative words for the misspelled word, ranking the list of alternative words based on a context of the input text, selecting one of the alternative words from the list, and replacing the misspelled word in the text with the selected one of the alternative words. In preferred embodiments, the present invention is operable in an interactive mode, in which the selecting step is performed manually (i.e., a user selects an alternative word from the list), or in an automatic mode, in which the selecting step is performed automatically (i.e., without user intervention) based on predetermined criteria. These modes are described in more detail below.

Interactive Mode

Figure 3:
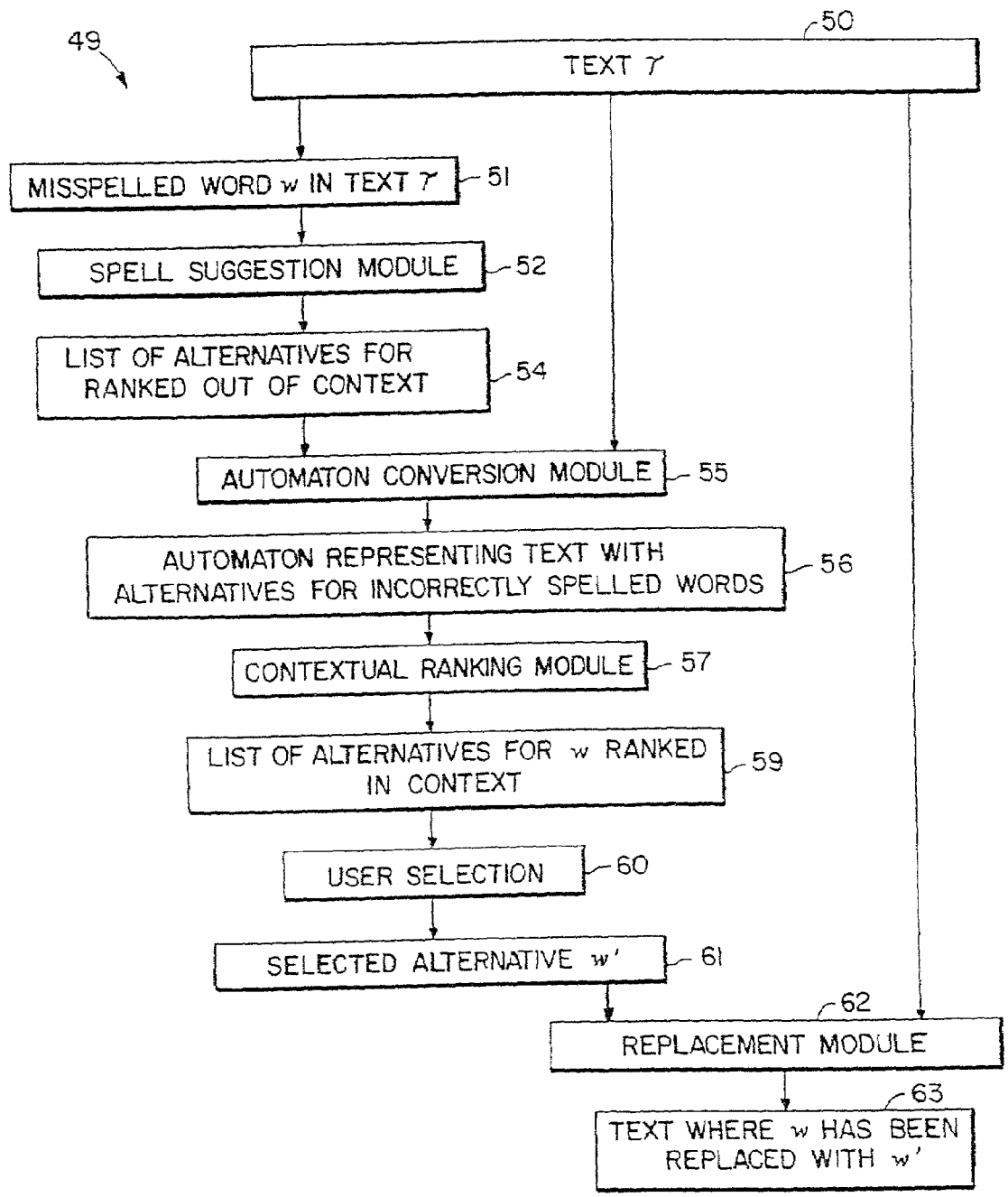
FIG. 3 depicts operation of the spelling and grammar checking system of the present invention in a manual mode.

FIG. 3 depicts operation of spelling and grammar checking code 49 in the interactive mode, and the various modules (i.e., computer-executable process steps) included therein. To begin, text 50 is input into the spelling and grammar checking system. Next, in step 51, a misspelled word in the text is detected by a spell-checking module (not shown). In preferred embodiments of the invention, step 51 detects misspelled words by comparing each word in the input text to a dictionary database and characterizing a word as misspelled when the word does not match any words in the dictionary database. To this end, step 51 also checks for proper placement of accent marks and/or diacritic marks in the input word. In cases where these marks are improperly placed, step 51 characterizes the word as misspelled.

Following step 51, the misspelled word is passed to spelling suggestion module 52. Spelling suggestion module 52 suggests "out-of-context" corrections for the misspelled word. That is, spelling suggestion module 52 determines a list of correctly-spelled alternative (or "replacement") words for the misspelled word without regard to the context in which the misspelled word appears in input text 50. A detailed description of the operation of spelling suggestion module 52 is provided below. For now, suffice it to say that spelling suggestion module 52 determines this list of alternative words by inserting, deleting, replacing, and/or transposing characters in the misspelled word until correctly-spelled alternative words are obtained. Spelling suggestion module 52 also identifies portions (e.g., characters) of the misspelled word which sound substantially similar to portions of correctly-spelled alternative words in order to obtain additional correctly-spelled alternatives words. Once all alternative words have been determined, spelling suggestion module 52 ranks these words in a list based, e.g., on a number of typographical and/or phonetic modifications that must be made to the misspelled word in order to arrive at each alternative word.

List 54 of alternative words, which was output by spelling suggestion module 52, is then passed to automaton conversion module 55, along with original text 50. A detailed description of the operation of automaton conversion module 55 is provided below. For now, suffice it to say that automaton conversion module 55 converts text 50 and list 54 into an input finite state machine (hereinafter "FSM"), such as a finite state transducer (hereinafter "FST") or a finite state automaton (hereinafter "FSM"), having a plurality of arcs. Each arc in the input FSM includes an alternative word and a rank (e.g., a weight, a probability, etc.) associated with each alternative word. This rank corresponds to a likelihood that the alternative word, taken out of context, comprises a correctly-spelled version of the original misspelled word.

In this regard, the concept of FSTs is described in Roche, Emmanuel, "Text Disambiguation by Finite-State Automata: An Algorithm and Experiments on Corpora", Proceedings of the Conference, Nantes (1992), Roche, Emmanuel and Schabes, Yves, "Introduction to Finite-State Language Processing", Finite-State Language Processing. (1997), Koskenniemi, Kimmo, "Finite-State Parsing and Disambiguation", Proceedings of the Thirteenth International Conference on Computational Linguistics, Helsinki, Finland (1990), and Koskenniemi et al. "Compiling and using Finite-State Syntactic Rules", Proceedings of the Fifteenth International Conference on Computational Linguistics. (1992). The contents of these articles are hereby incorporated by reference into the subject application as if set forth herein in full. To summarize, FSTs are FSMs have a finite number of states with arcs between the states. These arcs have one input and one or more outputs. Generally speaking, an FST functions as a particular method for mapping inputs to outputs. The present invention uses FSTs with weights, such as the those described in Pereira et al. "Weighted Rational Transductions and Their Application to Human Language Processing", ARPA Workshop on Human Language Technology (1994). The contents of this article is hereby incorporated by reference into the subject application as if set forth herein in full.

Returning to FIG. 3, in preferred embodiments of the invention, automaton conversion module 55 also identifies predetermined words in the input text which are commonly confused, but which are correctly spelled. Examples of such word are principal and principle and who and whom. Specifically, in these embodiments of the invention, automaton conversion module 55 identifies such words by reference to a pre-stored database, and then either adds such words to the FSM or creates a new FSM specifically for these words. In other embodiments of the invention, these commonly-confused words may be identified by spelling suggestion module 52, characterized as misspelled words by virtue of their identification, and then processed in the same manner as misspelled words. In either case, the output of the automaton conversion module 55 is the same, i.e., an FSM containing arcs with alternative words for a misspelled word.

Automaton conversion module 55 then transmits input FSM 56 (which in preferred embodiments is an FST) to contextual ranking module 57. Contextual ranking module 57 ranks alternative words in input FSM 56 by taking into account the context (e.g., grammar, parts-of-speech, etc.) of text 50. In brief, contextual ranking module 57 generates a second FSM for text 50 and the alternative words in accordance with one or more of a plurality of predetermined grammatical rules. This second FSM is comprised of a plurality of arcs which include the alternative words and ranks (e.g., weights) associated therewith, where a rank of each alternative word corresponds to a likelihood that the alternative word, taken in grammatical context, comprises a correctly-spelled version of the misspelled word. Contextual ranking module 57 then combines corresponding ranks of input FSM 56 and the second FSM (e.g., contextual ranking module 57 adds weights from respective FSMs) so as to generate an "in-context" ranking of the alternative words. Then, contextual ranking module 57 outputs a list 59 of alternative words for the misspelled word, which are ranked according to context. A more detailed description of the operation of contextual ranking module 57 is provided below.

Ranked list 59 of alternative words, which was generated by contextual ranking module 57, is then displayed to a user, e.g., on display screen 11. In step 60, the user can then manually select (using, e.g., mouse 14, keyboard 12, etc.) one of the alternative words from ranked list 59. Thereafter, the selected one of the alternative words (i.e., selected alternative 61) is provided to replacement module 62, along with original text 50. Replacement module 62 replaces the misspelled word in text 50 with user-selected alternative word 61, and then outputs corrected text 63.

Automatic Mode

Figure 4:
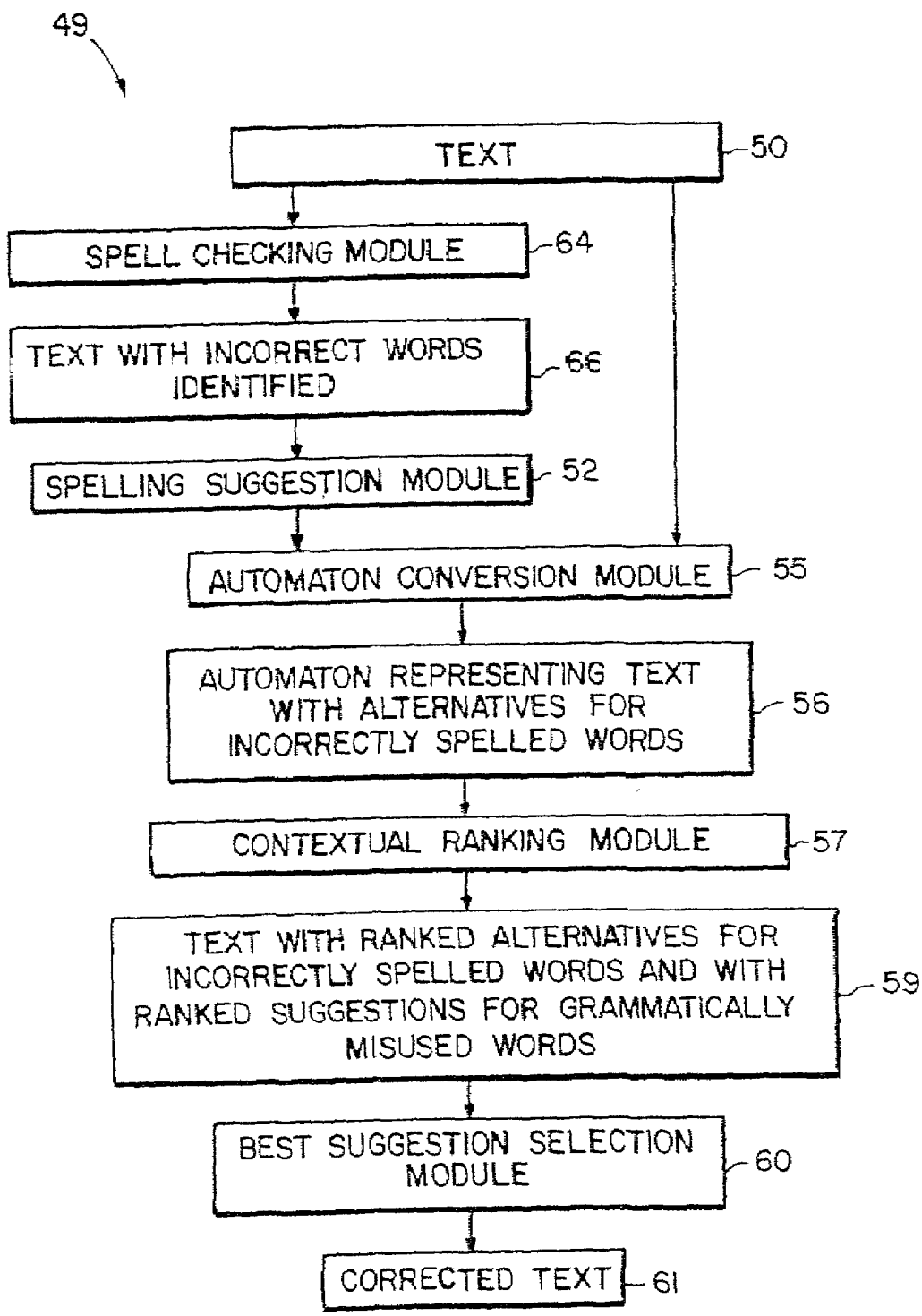
FIG. 4 depicts operation of the spelling and grammar checking system of the present invention in an automatic mode.

FIG. 4 shows the operation of the automatic mode of the present invention. More specifically, FIG. 4 depicts operation of spelling and grammar checking code 49 in the automatic mode, and the various modules (i.e., computer-executable process steps) included therein. Those modules which are identical to modules described above with respect to the interactive mode are described only briefly.

To begin, text 50 is input to spell checking module 64. Spell checking module 64 is identical to that described above in the interactive mode, except that, in this mode, spell checking module 64 searches through all of text 50 in order to detect all misspelled words. Which mode (i.e., interactive or automatic) spell checking module 64 operates in is set beforehand, e.g., in response to a user input. Once all misspelled words have been detected, spell checking module 64 outputs text 66 with the incorrectly-spelled words appropriately identified.

Next, text 66, i.e., the text with the incorrectly spelled words identified, is provided to spelling suggestion module 52. Spelling suggestion module 52 is identical to that described above, except that, in this mode, spelling suggestion module 52 determines and outputs a list of correctly-spelled alternative (or "replacement") words for every misspelled word in text 50, rather than for just one misspelled word. Which mode (i.e., interactive or automatic) spelling suggestion module 52 operates in is set beforehand, e.g., in response to a user input.

As before, spelling suggestion module 52 outputs a list of "out-of-context" alternative words to automaton conversion module 55. Automaton conversion module 55 is identical to that described above, except that, in this mode, automaton conversion module 55 generates an FSM 56 (see above) for each misspelled word in input text 50. These FSMs are then transmitted to contextual ranking module 57. Contextual ranking module 57 is identical to that described above, in that it generates a second FSM for input text 50 based on a plurality of predetermined grammatical rules and combines this second FSM with FSM 56 generated by automaton conversion module 55 in order to provide a contextually-ranked list 59 of the alternatives for each misspelled word in text 50.

Thereafter, list 59 is provided from contextual ranking module 57 to best suggestion selection module 60. Best suggestion selection module 60 selects the "best" alternative for each misspelled word, replaces each misspelled word in the text with its corresponding best alternative, and outputs corrected text 61, which includes these best alternatives in place of the misspelled words. In preferred embodiments of the invention, best suggestion selection module 60 selects each best alternative based on list 59 without any user intervention. For example, best suggestion module 60 may select the first, or highest, ranked alternative word in list 59, and then use that word to correct the input text.

Spelling Suggestion Module

In brief, spelling suggestion module 52 determines and outputs alternative words for a misspelled word in input text 50. In preferred embodiments of the invention, these alternative words are not ranked according to context, but rather are ranked based on the number of typographical changes that must be made to the misspelled word to arrive at an alterative word. To this end, spelling suggestion module 52 is comprised of computer-executable process steps to store one or more lexicon FSTs (in general, FSMs), where each of the lexicon FSTs includes plural reference words and a phonetic representation of each reference word, and to generate an input FST (in general, an FSM) for a misspelled word, where the input FST includes the misspelled word and a phonetic representation of the misspelled word. Spelling suggestion module 52 also includes computer-executable process steps to select one or more reference words from the lexicon FSTs based on the input FST, where the one or more reference words substantially corresponds to either a spelling of the misspelled word or to the phonetic representation of the misspelled word.

Figure 5:
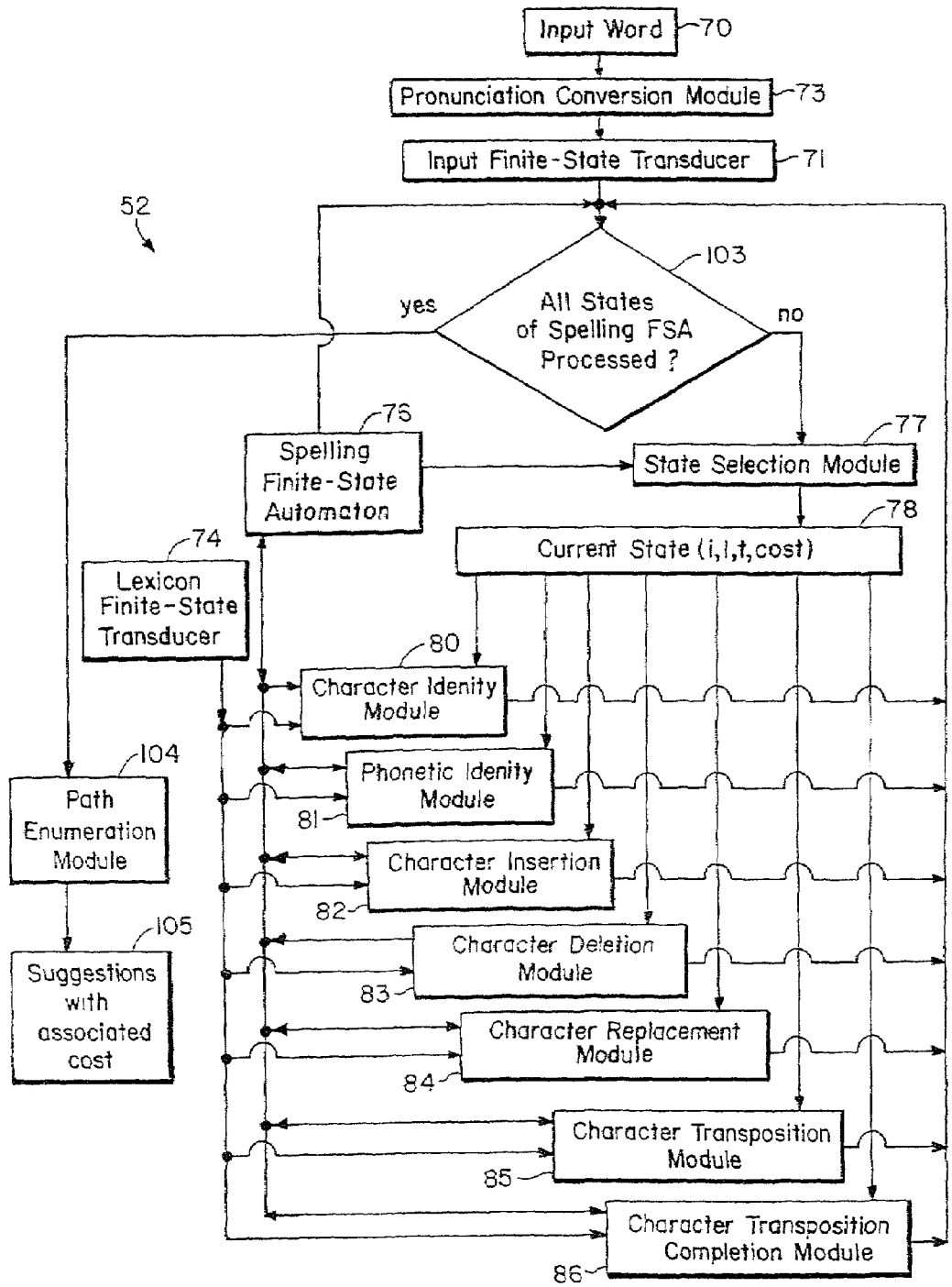
FIG. 5 depicts operation of a spelling suggestion module used in the spelling and grammar checking system of the present invention.

In more detail, FIG. 5 shows process steps comprising spelling suggestion module 52, together with sub-modules included therein. To begin, word 70 is input from a spell-checking module (see. e.g., FIG. 4). Pronunciation conversion module 73 then converts input word 70 into input FST 71. The details of the operation of pronunciation conversion module 73 are provided below.

Figure 6:
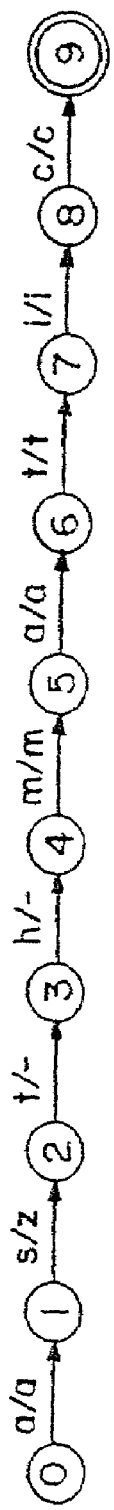
FIG. 6 depicts an input finite state transducer ("FST") generated by the spelling suggestion module depicted in FIG. 6.
Figure 7:
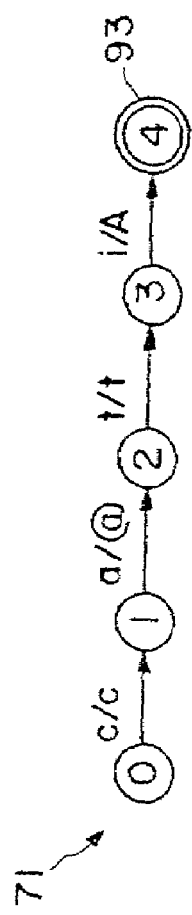
FIG. 7 shows another example of an FST generated by the spelling suggestion module depicted in FIG. 6.

Input FST 71 represents the spelling and pronunciation of input word 70. More specifically, each arc of input FST 71 includes a pair of characters c/p, where c is a character in input word 70 and p is a phonetic symbol representing the pronunciation of character c. FIG. 6 shows such an input FST for the word asthmatic (with its pronunciation azmatic). FIG. 7 shows an example of another input FST, this time for the misspelled word cati (with its pronunciation c@ti). The phonetic symbol "-" shown in FIG. 6 is used to represent a character which is not pronounced. In this regard, although the present invention mostly employs standard characters to illustrate pronunciation, the invention is not limited to using such characters. In fact, any convention can be adopted.

Figure 8:
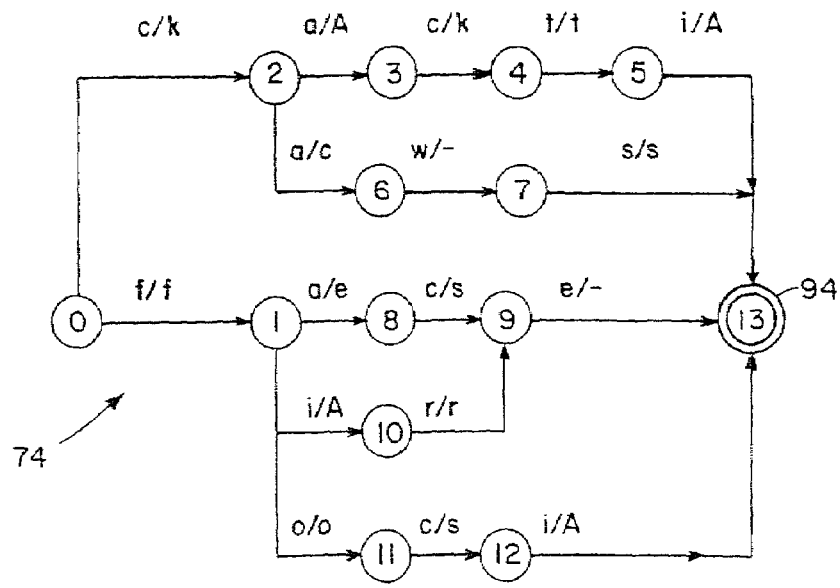
FIG. 8 shows an example of a lexicon FST used in the spelling suggestion module depicted in FIG. 6.

Lexicon FST 74 is preferably stored in a single memory, and comprises one or more lexicon FSTs (or FSMs, in general) which have been generated by the process steps of the present invention. Each of these lexicon FSTs includes plural reference words (e.g., English-language words, French-language words, German-language words, etc.) and a phonetic representation of each reference word. An example of a lexicon FST is shown in FIG. 8. This FST represents the following word/pronunciation pairs: cacti/k@ktA, caws/kc-s, face/fes-, fire/fAr-, and foci/fosA.

Spelling FSA 76 comprises an additional FSM which has been generated by the process steps of the present invention. Specifically, spelling FSA 78 includes a plurality of states, the states comprising at least states of lexicon FST 74 and states of input FST 71. Spelling FSA 76 is used to select one or more reference words from lexicon FST 74. These selected reference words comprise the alternative words for output by spelling suggestion module 52.

In more detail, each state of spelling FSA 76 is identified by a quadruple (i,l,t,cost), in which the first element i is a state in input FST 71 and records which portion of input word 70 has been already processed; the second element l is a state in lexicon FST 74 which records words that are potential alternatives for the input word; the third element t indicates whether a character transposition has occurred in the input word (e.g., rluer to ruler, in which the l and u have been transposed) and thus whether characters preceding the transposed characters must be re-examined; and the fourth element cost is the cost associated with a current suggested alternative to input word 70, meaning an indication of the likelihood that the current suggested alternative is actually the correct spelling of input word 70. In this regard, in preferred embodiments of the invention, the lower the cost of a state in spelling FSA 76, the more likely that state represents a path to the correct spelling of input word 70.

Figure 9:
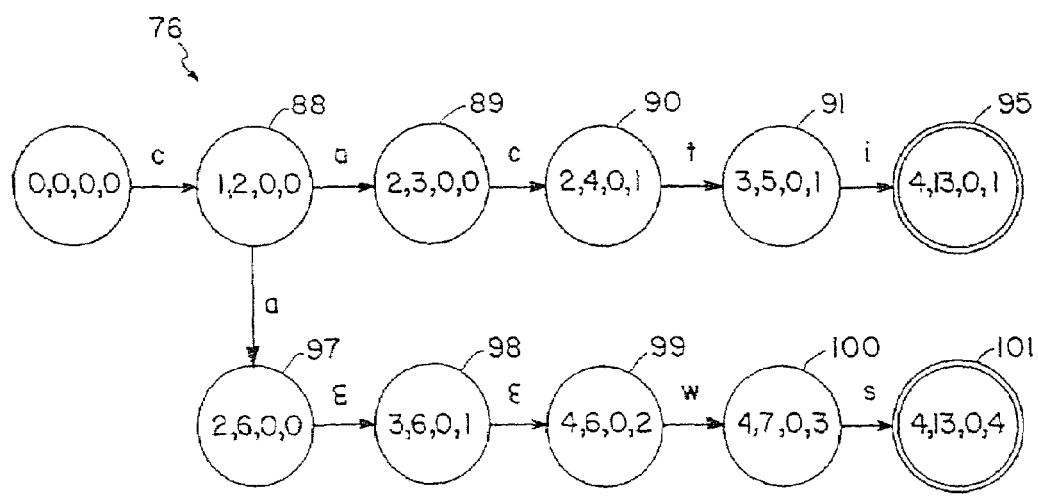
FIG. 9 shows an example of a spelling FST used in the spelling suggestion module depicted in FIG. 6.

FIG. 9 shows a representative embodiment of spelling FSA 76. As shown in FIG. 9, the arcs of spelling FSA 76 are labeled with characters which represent suggested alternatives for input word 70. To begin operation, spelling FSA 76 is initialized to state (i=0,l=0,t=0,cost=0), which represents the fact that the process starts at the initial state 0 in input FST 71, and at initial state 0 in lexicon FST 74, with no character transpositions (represented by t=0) and a 0 cost. Thereafter, each state of spelling FSA 76 is processed. Of course, the invention can be modified to process less than all states of spelling FSA 76. To this end, spelling suggestion module 52 includes state selection module 77. State selection module 77 selects which states of spelling FSA 76 are to be processed. For example, state selection module 77 may select states having lowest costs, so as to assure that potentially best solutions are processed first. Other embodiments of the present invention, of course, may use a different strategy.

Once state selection module 77 has selected a state (i,l,t,cost) to be processed, this state is provided as input to each of following modules: character identity module 80, phonetic identity module 81, character insertion module 82, character deletion module 83, character replacement module 84, character transposition module 85, and character transposition completion module 86. Each of these modules process the current state (i,l,t,cost) 78 of spelling FSA 76 (as set by state selection unit 77), and may also add new states to spelling FSA 76.

In brief, character identity module 80 determines whether characters of a reference word in lexicon FST 74 match characters of word 70 in input FST 71. Phonetic identity module 81 determines whether characters of the reference word are pronounced the same as characters of the input word. Character insertion module 82 determines whether a character inserted in the input word causes at least part of the input word to match at least part of the reference word. Character deletion module 83 determines whether a character deleted from the input word causes at least part of the input word to match at least part of the reference word. Character replacement module 84 replaces characters in the input word with characters in the reference word in order to determine whether at least part of the input word matches at least part of the reference word. Character transposition module 85 changes the order of two or more characters in the input word and compares a changed character in the input word to a corresponding character in the reference word. Finally, character transposition completion module 86 compares characters in the input word which were not compared by character transposition module 85 in order to determine if at least part of the input word matches at least part of the reference word.

In more detail, character identity module 80 checks whether there is a word in lexicon FST 74 which starts at state l and which has a next character that is the same as the next character in input FST 71 at state i. Given a current spelling FSA state of (i,l,t,cost), for all outgoing arcs from state l in lexicon FST 74 going to a state l' and labeled with pair c/p (where c is a character and p is a pronunciation of that character), and for all outgoing arcs from state i in input FST 71 going to state i' and labeled with the pair c/p' (where c is a character and p' is a pronunciation of the character), character identity module 80 creates an arc in spelling FSA 76 from state (i,l,t,cost) to a newly-added state (i',l',0,cost), and labels that arc with character c.

Phonetic identity module 81 checks whether there is a word in lexicon FST 74 starting at state l whose next character is pronounced the same as the next character in input FST 71 at state i. For this processing, the phonetic representations of characters are processed. That is, given a current spelling FSA state of (i,l,t,cost), for all outgoing arcs from state l in lexicon FST 74 going to a state l' and labeled with the pair c/p (where c is a character and p is a pronunciation of that character), and for all outgoing arcs from state i in input FST 71 going to state i' and labeled with the pair c'/p (where c' is a character and p is a pronunciation of the character), phonetic identify module 81 creates an arc in spelling FSA 76 from state (i,l,t,cost) to a newly-added state (i',l',0,cost+phonetic_identity_cost), and labels that arc with character c. This newly-added state has its cost increased by a predetermined cost, called phonetic_identity_cost, which has a pre-set value that is associated with the fact that the pronunciation of a current character in input FST 71 is identical to the pronunciation of the current character in lexicon FST 74 even though the characters are different.

Character insertion module 82 inserts a character from lexicon FST 74 into input word 70 in input FST 71. More specifically, given a current spelling FSA state of (i,l,t,cost), for all outgoing arcs from state l in lexicon FST 74 going to a state l' and labeled with the pair c/p (where c is a character and p is a pronunciation of that character), character insertion module 82 creates an arc in spelling FSA 76 from state (i,l,t,cost) to state (i,l',0 insertion_cost), and labels that arc with character c. This newly-added state has its cost increased by a predetermined cost, called insertion_cost, which has a pre-set value that is associated with the fact that a character has been inserted into word 70 in input FST 71.

Character deletion module 83 deletes a character from input word 70 in input FST 71. More specifically, given a current spelling FSA state of (i,l,t,cost), for all outgoing arcs from state i in input FST 71 going to a state i' and labeled with the pair c/p (where c is a character and p is a pronunciation of that character), character deletion module 83 creates an arc in spelling FSA 76, which is labeled with "empty character"_from state (i,l,t,cost) to a newly added state (i',l,0,cost+deletion_cost). This newly added state has a cost that is increased by a predetermined cost, called deletion_cost, which has a pre-set value that is associated with the fact that a character has been deleted from input word 70 in input FST 71.

Character replacement module 84 replaces a next character in input word 70 with a next character in lexicon FST 74. More specifically, given a current spelling FSA state of (i,l,t,cost), for all outgoing arcs from state l in lexicon FST 74 going to a state l' and labeled with the pair c/p (where c is a character and p is a pronunciation of that character), and for all outgoing arcs from state l in input FST 71 going to a state l' and labeled with the pair c'/p' (where c' is a character and p' is a pronunciation of that character), character replacement module 84 creates an arc in spelling FSA 76 to a newly added state (i',l',0,cost+replacement_cost), and labels that arc with character c from state (i,l,t,cost). This newly-added state has its cost increased by a predetermined cost, called replacement_cost, that has a pre-set value and that is associated with the fact that a character has been replaced by another character in input word 70.

Character transposition module 85 interchanges the order of two consecutive characters in input word 70, and checks the validity of the next character while remembering the original order of the characters. More specifically, given a current spelling FSA state of (i,l,t,cost), for all outgoing arcs from state i in input FST 71 going to a state i1 and labeled with the pair c1/p1 (where c1 is a character and p1 is a pronunciation of that character), for all outgoing arcs from state i1 in input FST 71 going to a state i2 and labeled with the pair c2/p2 (where c2 is a character and p2 is a pronunciation of that character), and for all outgoing arcs in lexicon FST 74 going from state l to state l' labeled with the pair c2/p' (where c2 is a character and p' is a pronunciation of that character), character transposition module 85 creates an arc in spelling FSA 76 from state (i,l,t,cost) to a newly-added state (i2,l',c1,cost+transposition_cost), and labels that arc with character c2. This newly-added state has its cost increased by a predetermined cost, called transposition_cost, which has a value that is pre-set and that is associated with the fact that two characters have been transposed in input word 70.

Character transposition completion module 86 completes the transposition of two characters that was started by character transposition module 85. More specifically, given a current spelling FSA state (i,l,t,cost), where t is not zero (indicating that character transposition has occurred), for all outgoing arcs in lexicon FST 74 going from state l to state l' labeled with the pair t/p' (where t is a character and p is a pronunciation of that character), character transposition completion module 86 creates an arc in spelling FSA 76 from the state (i,l,t,cost) to a newly-added state (i,l,0,cost+transposition_completion_cost), and labels that arc with the character t. This newly-added state has its cost increased by a predetermined cost, called transposition_completion_cost, which has a value that is pre-set and that is associated with the fact that the second of the transposed characters has been read.

The following describes operation of some of the foregoing modules in an actual example. More specifically, with reference to FIGS. 7, 8 and 9, when input FST 71 (see FIG.

7) moves from state 0 (i) to state 1 (i'), and lexicon FST 74 (see FIG. 8) moves from state 0 (l) to state 2 (l'), state 88 is created in spelling FSA 76 (see FIG. 9), which has a state of (1,2,0,0) or (i',l',0,cost) and an arc with the character c. In this example, there is no character transposition or cost, since character identity module 80 was used (i.e., there is a "c" in the arcs of both input FST 71 and lexicon FST 74). Accordingly, at state 88, spelling FSA 76 has no cost. Following this processing (i.e., if state selection module 77 selects the following additional states), when input FST 71 moves from state 1 (i) to state 2 (i'), and lexicon FST 74 moves from state 2 (l) to state 3 (l'), state 89 is created in spelling FSA 76, which has a state of (2,3,0,0) or (i',l',0,cost) and an arc with the character a. Again, there is no character transposition or cost, since character identity module 80 was used. Next, input FST 71 remains at state 2, while lexicon FST 74 moves from state 3 to state 4, thereby creating state 90 in spelling FSA 76, which has a state of (2,4,0,1). In this case, an additional character, namely a c, is added in lexicon FST 74 which is not present in input FST 7, i.e., character insertion module 82 was used. As a result, a cost of 1 is added to state 90 of spelling FSA 76. Next, input FST 71 moves from state 2 (i) to state 3 (i'), and lexicon FST 74 moves from state 4 (l) to state 5 (l'), thereby creating state 91 in spelling FSA 76, which has a state of (3,5,0,1) or (i',l',0,cost) and an arc with the character t. In this case, there is no character transposition or additional cost, since character identity module 80 was used. Finally, input FST 71 moves from state 3 (i) to end state 4 (i') (marked by double circle 93), and lexicon FST 74 moves from state 5 (l) to end state 13 (l') (marked by double circle 94), thereby generating state 95 in spelling FSA 76, which has a state of (4,13,0,1) or (i',l',0,cost) and an arc with the character i. Again, there is no character transposition or additional cost, since character identity module 80 was used.

Similar processing is also performed for the other states shown in lexicon FST 74 to create additional states 97 to 101 with character deletion module 83 being used between states 97 and 99, and with an_in arcs between those states indicating that a character has been deleted from the word in input FST 71. Once this processing is finished, as shown in FIG. 9, the cost of state 101 (i.e., 4) is higher than the cost of state 95 (i.e., 1). Accordingly, the word corresponding to the path of state 95 (in this case, cacti) is ranked by spelling suggestion module 52 higher than the word corresponding to the path of state 101 (in this case, caws).

At this point, it is noted that although spelling suggestion module 52, and the rest of the invention for that matter, is described with respect to a word in an input text sequence comprised of plural words, the spell-checking aspect of the invention can be used equally well with a single-word input. Of course, the grammar checking aspects of the invention would not apply in this instance. Accordingly, those modules shown in FIGS. 2 and 3 which deal solely with grammar checking would simply be skipped when checking a single-word input.

Once all states of input FST 71 and lexicon FST 74 have been processed in the foregoing manner, as determined in block 103 of FIG. 5, the spelling FSA generated by the process is provided to path enumeration module 104. Path enumeration module 104 analyzes the spelling FSA in order to associate words therein with appropriate costs, and outputs list 105 of suggested alternative words with their associated costs (e.g., weight). Thereafter, processing ends.

Pronunciation Conversion Module

As noted above, pronunciation conversion module 73 converts input word 70 into input FST 71. In general, pronunciation conversion module 73 converts any word, whether correctly spelled or misspelled, into an input FST which includes a phonetic representation of the input word, together with the input word. As noted above, FIG. 6 shows an input FST for the word asthmatic with its pronunciation azmatic.

Pronunciation conversion module 73 utilizes a pre-stored phonetic dictionary of words, in which a pronunciation of each character of a word is associated with a phonetic symbol which represents the pronunciation of that character in the context of a word. In order to associate to each character of an input word with a pronunciation, pronunciation conversion module 73 reads the input word from left to right and finds the longest context in the phonetic dictionary which matches the input word. Pronunciation conversion module 73 then transcribes that longest match with phonetic characters until no characters in the input word are left unpronounced. The output is represented as an FST (see, e.g., FIG. 6), in which each arc is labeled with a pair c/p.

Automaton Conversion Module

Returning to FIG. 3, in brief, automaton conversion module 55 is comprised of computer-executable process steps to generate an FSM for input text 50, which includes a plurality of arcs. Each of these arcs includes an alternative word provided by spelling suggestion module 52 and a corresponding rank (e.g., weight) of that word. As noted above, a rank (e.i., a weight) of each alternative word corresponds to a likelihood that the alternative word, taken out of grammatical context, comprises a correctly-spelled version of a misspelled word. The ranks may be derived from the cost provided by spelling suggestion module 52.

In more detail, in preferred embodiments of the invention, automaton conversion module 55 generates an FST; although an FSM may be used in the present invention as well. For the sake of brevity, however, the invention will be described with respect to an FST. In this regard, such an FST comprises a finite-number of states, with arcs between the states. Each arc is labeled with a pair of symbols. The first symbol in each pair is an alternative word to the misspelled word found in text 50. The second symbol of each pair is a number representing a rank for that word. As noted above, these rankings are determined based on the number of character transpositions, deletions, additions, etc. that must be performed on the misspelled word in order to arrive at each alternative word.

Figure 10:
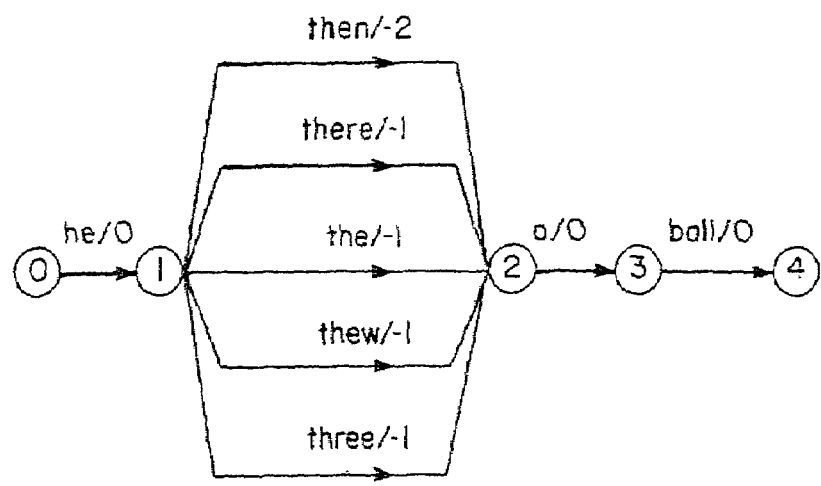
FIG. 10 illustrates an FST generated by an automaton conversion module used in the spelling and grammar checking code shown in FIGS. 3 and 4.

FIG. 10 illustrates an FST generated by automaton conversion module 55 for the input text he thre a ball. In this text, the word thre is misspelled (as determined by the spell-checking module). Accordingly, spelling suggestion module 52 provides the following alternative words to automaton conversion module 55: then, there, the, thew and three. Of course, the number and identity of these alternative words may vary depending upon the exact implementation of spelling suggestion module 52. In this embodiment of the invention, however, the alternative words are limited to those shown above. As shown in FIG. 10, ranks associated with the alternative words are negative, and correspond to a number of typographical changes that were made to the original word thre to arrive at each alternative word. For example, then has an associated weight of −2 because then can be obtained from thre by deleting the letter r and then inserting the letter n from thre.

Figure 11:
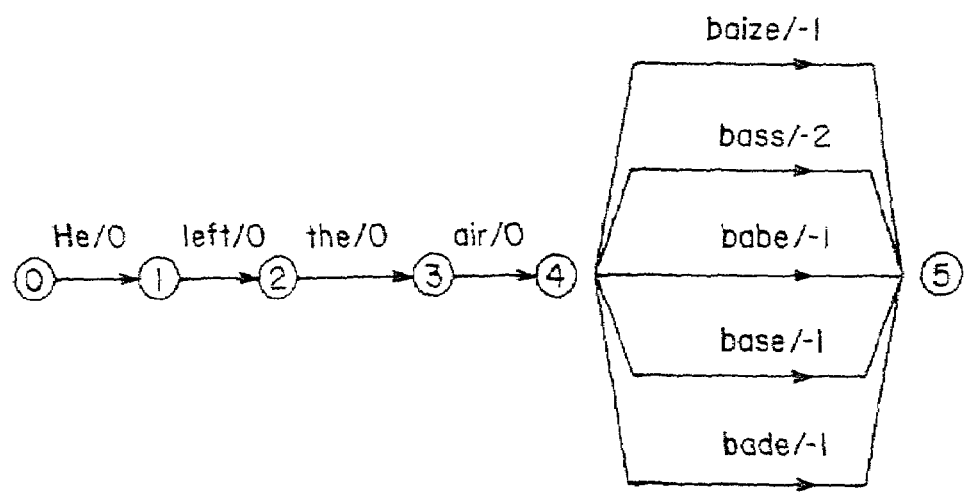
FIG. 11 shows another example of an FST generated by the automaton conversion module used in the spelling and grammar checking code shown in FIGS. 3 and 4.

FIG. 11 shows another example of an FST generated by automaton conversion module 55. In the example shown in FIG. 11, the FST is generated for the text He left the air baze. In this text, the incorrectly spelled word is baze, and the "out-of-context" alternative words provided by spelling suggestion module 52 are baize, bass, baba, base, bade. As noted above, the second symbol of each arc in the FST comprises a ranking, in this case a weight, for the alternative word on that arc. The higher the weight, the more likely the alternative word associated with that weight is the correct replacement word for the misspelled word. In the examples shown in FIGS. 10 and 11, suggested alternative words have negative weights which reflect the number of typographical and phonetic changes were made to the original misspelled word. In this regard, as shown in FIG. 11, the alternative words baize, babe, base and bade have the same weight, since each of these words differs from the misspelled word base by the same number of typographical changes.

Figure 12:
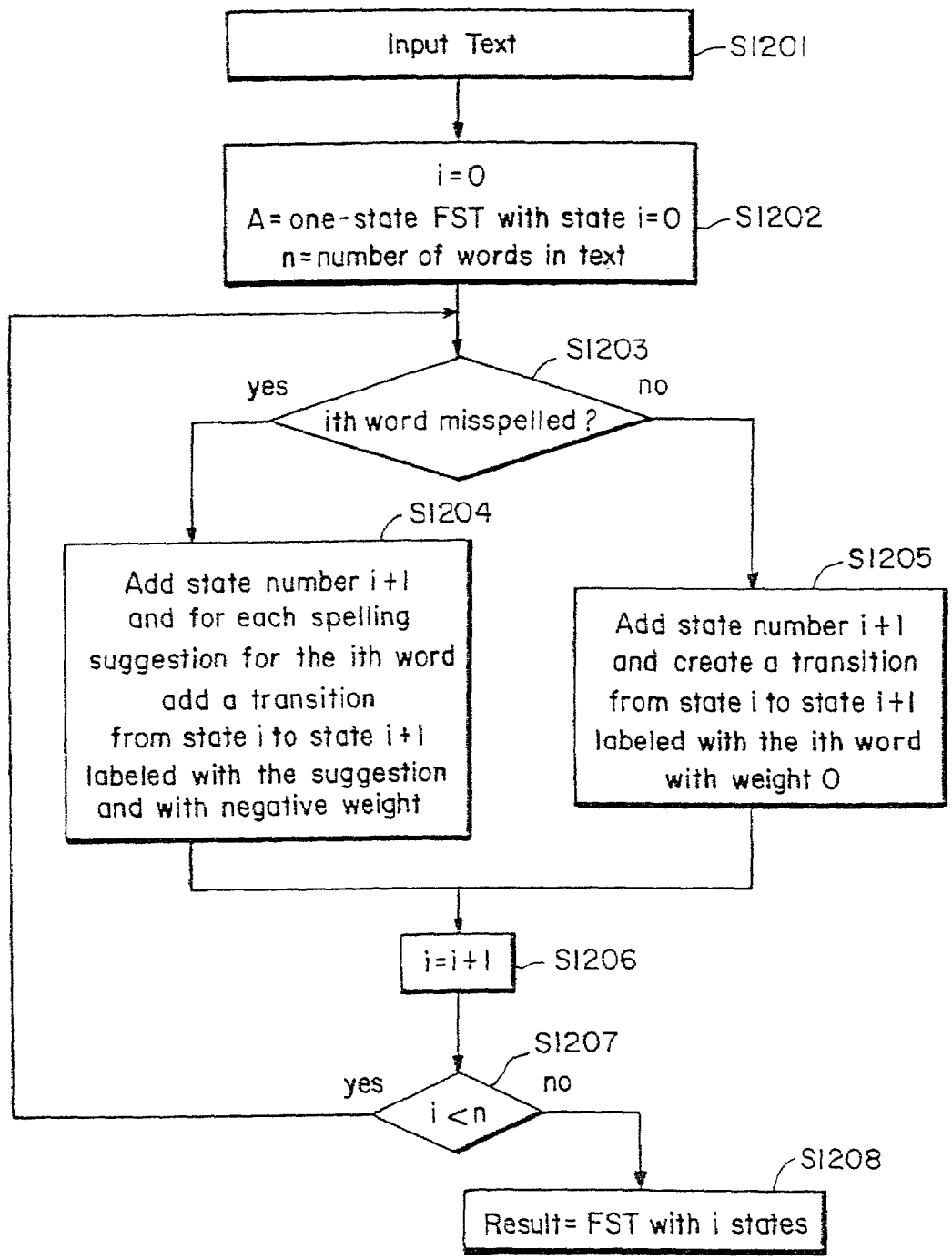
FIG. 12 shows process steps used by the automaton conversion module to generate FSTs.

FIG. 12 shows computer-executable process steps in automaton conversion module 55 for generating such an FST. More specifically, in step S1201, text 50 is input into automaton conversion module 55, together with alternative words from spelling suggestion module 52. In step S1202, variables are initialized. Specifically, in this example, word number i is set to 1 so that, initially, the FST has a single state labeled i. Also, the variable n is set to the number of words in the input text. Thereafter, step S1203 determines whether the $i^{th}$ input word in the text is misspelled and, in preferred embodiments of the invention, if the $i^{th}$ word is one of a plurality of predetermined words that are commonly confused. This aspect of automaton conversion module 55 is described in more detail below.

If step S1203 determines that the $i^{th}$ input word is misspelled, step S1204 generates a new state labeled i+1 for each of the alternative words provided by spelling suggestion module 52. Step S1204 also adds a transition from state i to state i+1. This transition is labeled with an alternative word and with a ranking (e.g., a negative weight). If, on the other hand, step S1203 determines that the $i^{th}$ input word is not misspelled, step S1205 creates a new state i+1 and a transition from state i to state i+1. This transition is labeled with the $i^{th}$ word and has a weight of zero. Thereafter, in step S1206, current state i is increased by one, and processing proceeds to step S1207. If step S1207 determines that a current state i is less than the number of words n, meaning that there are words in the input text still to be processed, flow returns to step S1203. If i equals n, processing ends, and the FST generated by steps S1201 to S1207 is output in step S1208.

As noted above, in preferred embodiments of the invention, automaton conversion module 55 may characterize words which are correctly spelled, but which are commonly confused, as misspelled words. This is done in order to flag these words as possible candidates for the grammar correction process which is described in more detail below. Examples of such words include who and whom. That is, these words are often misused, such as in the sentence I need an assistant who I can trust. Similarly, homophones, such as principal and principle are often confused. Appendix B shows a short lists of such words. Of course, this list is merely representative, and, in the actual invention, the list is much more extensive. This list is preferably stored in a database, e.g., in memory 20, and can be updated or modified via, e.g., fax/modem line 10. Alternatively, this list may be accessed from a remote location via network connection 9. Thus, automaton conversion module 55 identifies words which are often misused or confused based on such a list, and treats these words in the same manner as misspelled words provided by spelling suggestion module 52. That is, such words are included in arcs in the FST generated by automaton conversion module 55.

Contextual Ranking Module

Returning to FIG. 3, in brief, contextual ranking module 57 includes computer executable process steps to generate a second FST for the input text and the alternative words in accordance with one or more of a plurality of predetermined grammatical rules (with the first FSM being FST 56 described above). The second FST has a plurality of arcs therein which include the alternative words and ranks (e.g., weights) associated therewith. In this second FST, a weight of each alternative word corresponds to a likelihood that the alternative word, taken in grammatical context, comprises a correctly-spelled version of the misspelled word. Contextual ranking module 57 also includes computer-executable process steps to add corresponding weights of the first FST and the second FSM, to rank the alternative words in accordance with the added weights, and to output a list of the alternative words ranked according to context.

Figure 13:
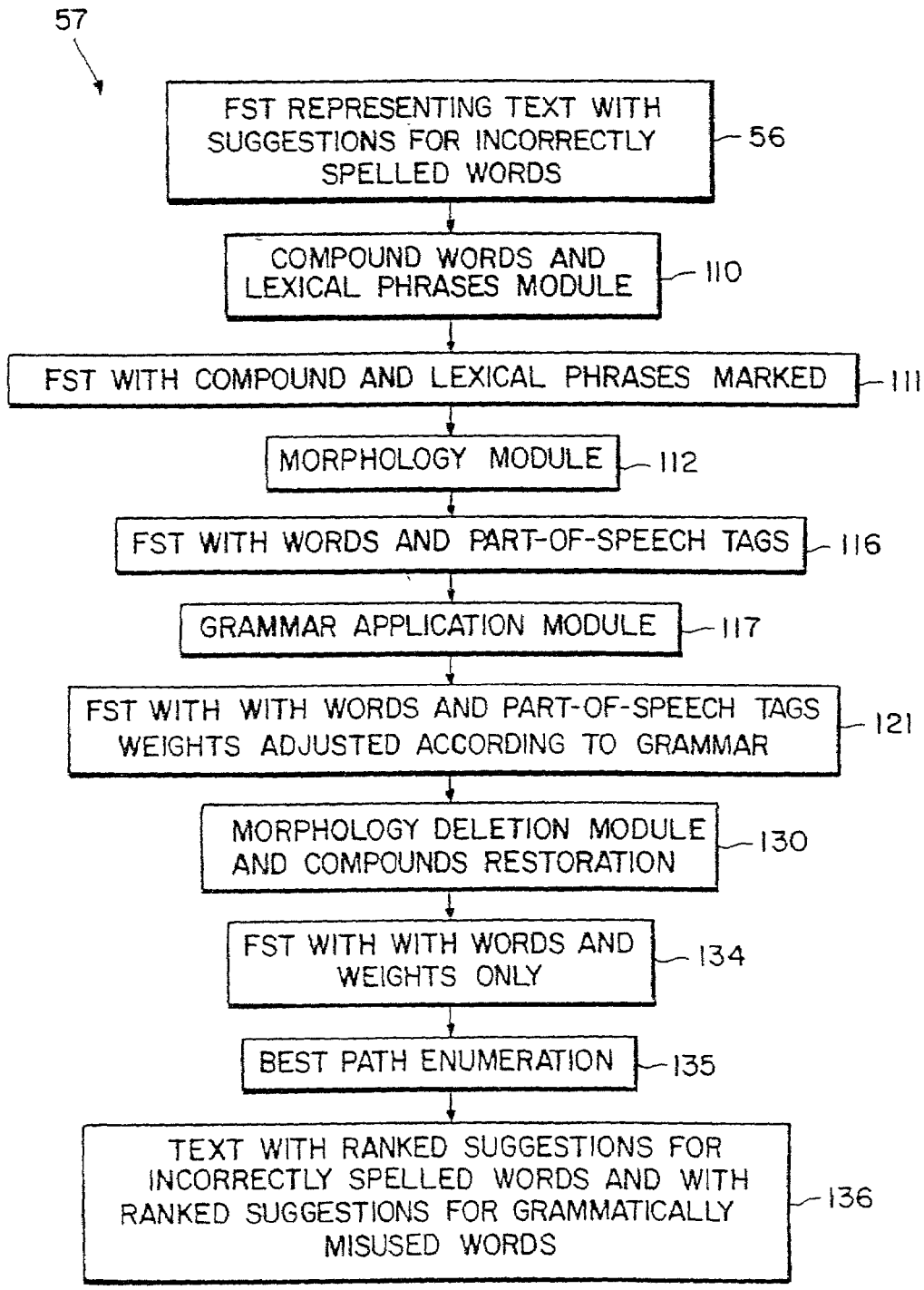
FIG. 13 shows process steps executed by a contextual ranking module in the spelling and grammar checking code to generate a ranked list of alternative words for a misspelled word.

In more detail, FIG. 13 shows computer-executable process steps in contextual ranking unit 57, together with executable modules included therein. To begin, FST 56 is input. As noted above, FST 56 was generated by automaton conversion module 55, and includes alternative words (e.g., misspelled words, commonly-confused words, etc.) ranked out of context. As also noted above, an example of such an FST is shown in FIG. 11 for the input text he left the air baze. As shown in FIG. 13, FST 56 is provided to compound words and lexical phrases module 110.

Compound Words and Lexical Phrases Module

Compound word and lexical phrases module 110 identifies words which may comprise part of a predetermined list of compound words (i.e., a word comprised of two separate words), and also adds these words as arcs in FST 56. By way of example, in the sentence Pilots practice with flight stimulators, the word stimulators is not necessarily misspelled, but is incorrect in context. That is, the typist meant to type flight simulators, but accidentally included an extra t in simulators. Compound words and lexical phrases module 110 compares the word stimulators to a pre-stored database of compound words. In a case that an input word, in this case stimulators, is similar to a word in a compound word (as measured, e.g., by a number of typographical changes between the input word and a word in a compound word, in this case simulators), compound words and lexical phrases module 110 includes the compound word as an alternative word in an arc of FST 56, together with a single rank associated with the compound word.

In the present invention, a database of compound words is preferably pre-stored, e.g., in memory 20. In preferred embodiments of the invention, each of the compounds words in the database is associated with a part-of-speech that defines a syntactic behavior of the compound word in a sentence. For example, a noun-noun compound, such as air base may be stored in the database and defined therein as a noun ("N"). Another example of a compound word is commercial passenger flight, which is defined in the database as a noun ("N"). Similarly, the phrase according to will be defined in the database as a preposition ("Prep").

As borne out in the examples provided above, in the database, each compound word or phrase has a single part-of-speech (e.g., part-of-speech tag "N", "Adv", etc.) associated therewith. Moreover, these words and phrases exhibit very little morphological or syntactic variation. For example, according to exhibits no morphological or syntactic variation. Similarly air base can be pluralized (air bases), but little else. Appendix C shows a list of representative compound words and phrases, together with their associated parts-of-speech, that are included in the database that is used by compound words and lexical phrase module 110.

Figure 14:
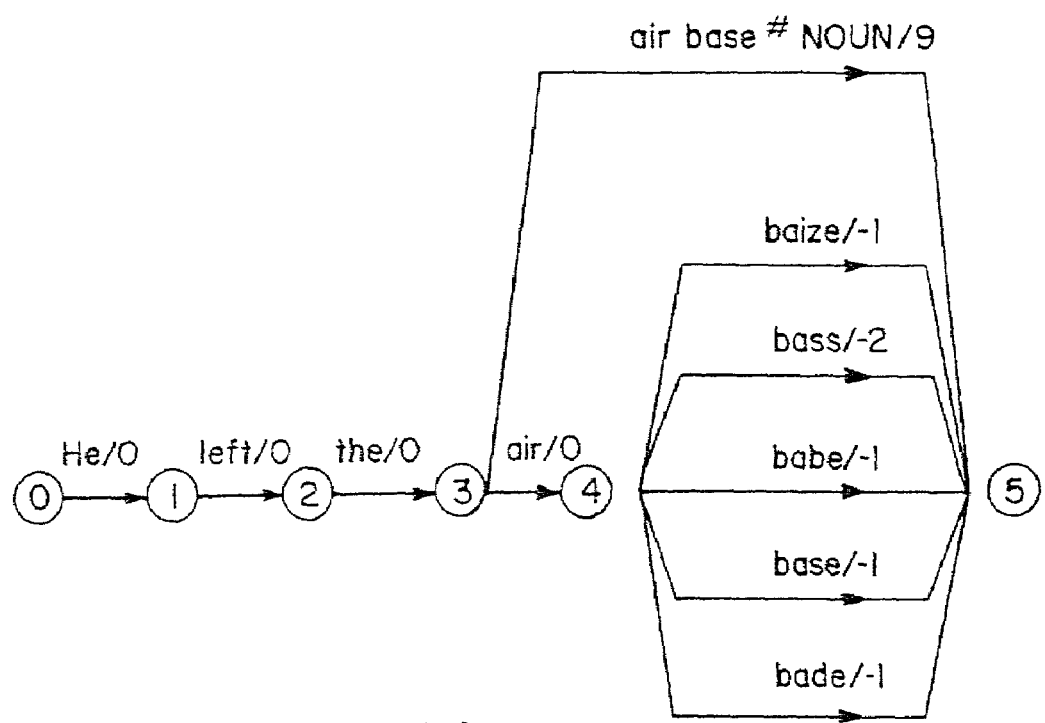
FIG. 14 shows an FST which includes a compound word which is used by the contextual ranking module to generate the ranked list.

In preferred embodiments of the invention, compound words and lexical phrases module 110 also adds, to FST 56, a part-of-speech tag for each compound word or phrase. In addition, compound words and lexical phrases module 110 also adds a relatively large weight to arcs containing potential compound words, reflecting the fact a word may, more likely than not, be a compound word. For the example FST shown in FIG. 11, compound words and lexical phrases module 57 produces the FST shown in FIG. 14. That is, compound words and lexical phrases module 110 adds a new arc labeled "air base#NOUN/9" from state 3 to state 5 in FIG. 14. As shown in the figure, this arc passes over both the word air and the five alternative words (baize, bass, babe, base, and bade). This new arc treats "air base" as if it were one word acting as a noun with relatively high weight of 9. Returning to FIG. 13, FST 111 output by compound words and lexical phrase module 110 is provided to morphology module 112.

Morphology Module

Morphology module 112 adds all possible morphological analyses of each word to FST 111. This morphological analysis is performed using a pre-stored morphological dictionary of words. In preferred embodiments of the invention, this morphological dictionary is represented as a collection of small FSTs, each representing a possible morphological analysis of each word. Weights in such FSTs correspond to a relative likelihood that a word is a particular part-of-speech.

Figure 15:
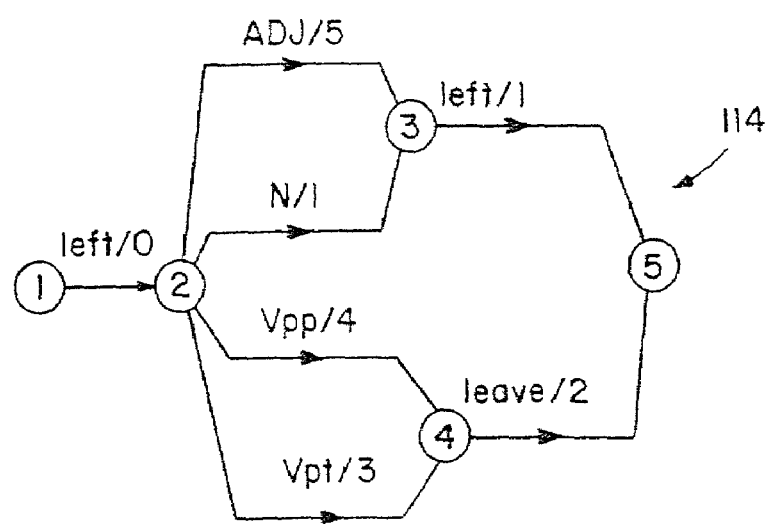
FIG. 15 shows an FST stored in a morphological dictionary which is used by the contextual ranking module to generate the ranked list.

For example, for the word left, FST 114 shown in FIG. 15 is stored in the morphological dictionary. As shown in FIG. 15, each path of the FST has a length of length three, with a first element being the initial word (in this case left) with a corresponding weight, the second element being a part-of-speech tag with a corresponding weight, and the third element being a root form of the initial word with a corresponding weight. Thus, FST 114 shown in FIG. 15 indicates that left can be an adjective ("ADJ") having a base form of left and a weight of 5, a noun ("N") having a base form of left and a weight of 1, a verb in past participle form ("Vpp") having a base form of leave and a weight of 4, or a verb in past tense form having a base form of leave and a weight of 3.

In the present invention, a weight of a particular path through an FST is computed as the sum of the weights of each of the arcs in the FST. For example, in the FST shown in FIG. 15, the path from states 1 to 2 to 4 to 5, in which the word left is a verb in past participle form of the base verb leave, has a weight of 4 (i.e., 0+4+0=4). Morphology module 112 replaces every arc in the FST which does not represent a compound word or a lexical phrase with an FST from the morphological dictionary. In addition, for each arc corresponding to a compound word or lexical phrase, such an arc is replaced by three arcs, where a first arc includes the compound word or lexical phrase, the second arc includes the part-of-speech of the compound word or lexical phrase, and the third arc also includes the compound word or lexical phrase. Thus, given as input the FST shown in FIG. 14, morphology module 112 outputs FST 116 shown in FIG. 16.

Grammar Application Module

Returning to FIG. 13, FST 116 produced by morphology module 112 is provided to grammar application module 117. In brief, grammar application module 117 comprises computer-executable process steps to receive a first FST 116 (or, in general, an FSM) from morphology module 112, where the first FST includes alternative words for at least one word in the input text and a weight (or, in general, a rank) associated with each alternative word. Grammar application module 117 then executes process steps to adjust the ranks in the first FST in accordance with one or more of a plurality of predetermined grammatical rules. Specifically, grammar application module 117 does this by generating a second FST (or, in general, an FSM) for the input text based on the predetermined grammatical rules, where the second FST includes the alternative words and ranks associated with each alternative word. The ranks in the second FST are then combined with the ranks in the first FST in order to generate a "contextual" FST in which weights of words therein are adjusted according to grammar.

Figure 17:
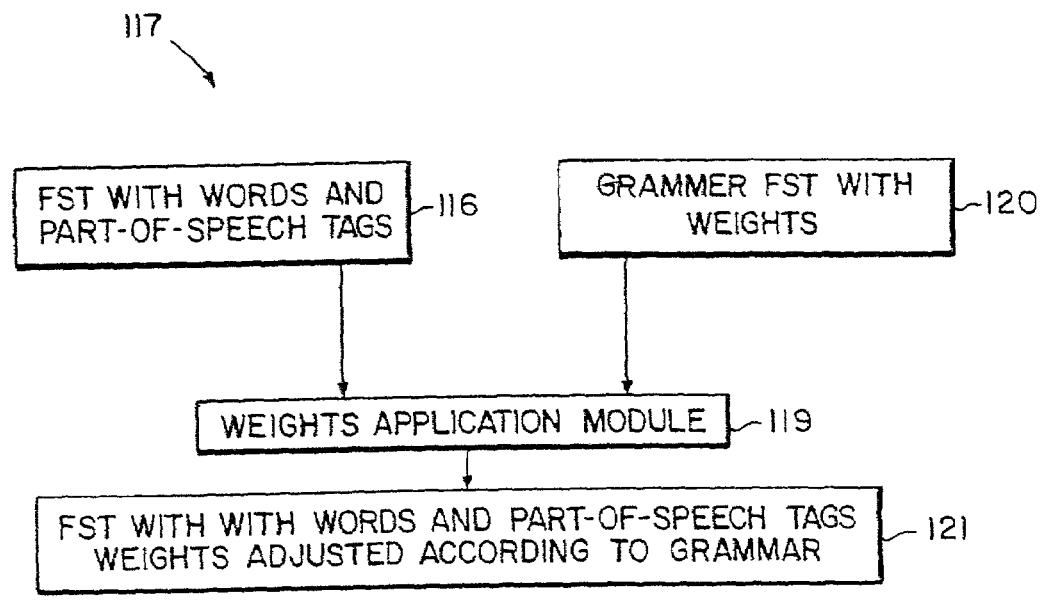
FIG. 17 shows operation of a grammar application module included in the contextual ranking module.

In more detail, FIG. 17 depicts operation of grammar application module 117. As shown in FIG. 17, grammar application module 117 includes weight application module 119. Weight application module 119 inputs FST 116 which was generated by morphology unit 112, together with grammar FST 120 (described below) which includes corresponding weights. In this regard, grammar FST 120 comprises general grammatical structures of a language, such as French, English, Spanish, etc., together with predetermined phrases in that language. Grammar FST 120 has substantially the same format as parts of input FST 116. Every path in grammar FST 116 has a length which is a multiple of three. Each arc therein includes three elements, with a first element comprising a reference word with a corresponding weight, a second element comprising a part-of-speech tag with a corresponding weight, and a third element comprising a root form of the reference word with a corresponding weight. A detail description of the construction of grammar FST 120 is provided below.

Weights application module 119 combines (e.g., adds) weights of input FST 116 and grammar FST 120 in order to produce a combined FST 121 in which weights therein are adjusted according to grammatical rules. More specifically, for each path from an initial state to a final state of grammar FST 120, weights application module finds a corresponding path in input FST 116. Thereafter, weights application module 119 replaces weights of input FST 116 with the combined weights of input FST 116 and grammar FST 120. By doing this, weights application module 119 reinforces paths in input FST 116 which are also found in grammar FST 120. For example, grammar FST 120 might include a path which indicates that a singular noun precedes a verb in the third person. Such a path can be used to reinforce portions of input FST 116 where a noun precedes a verb in third person.

Figure 16:
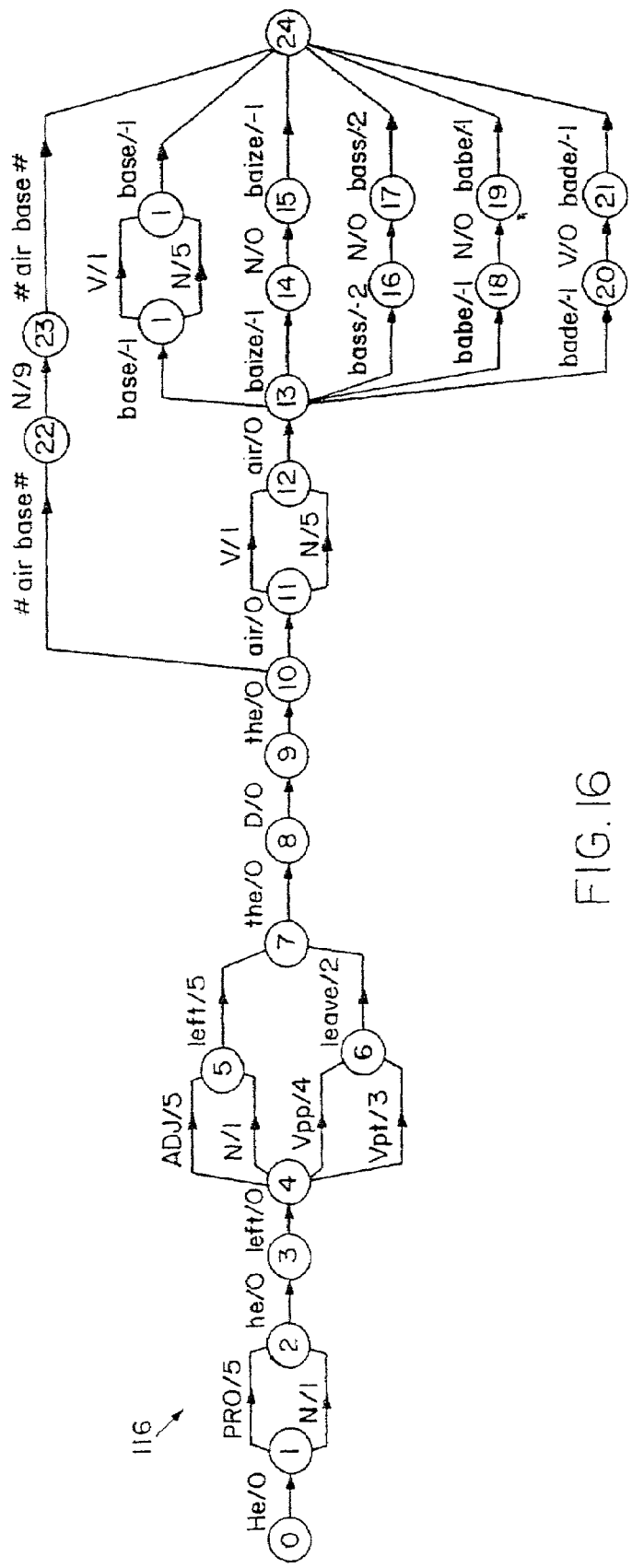
FIG. 16 shows an FST generated by a morphology module in the contextual ranking module.
Figure 18:
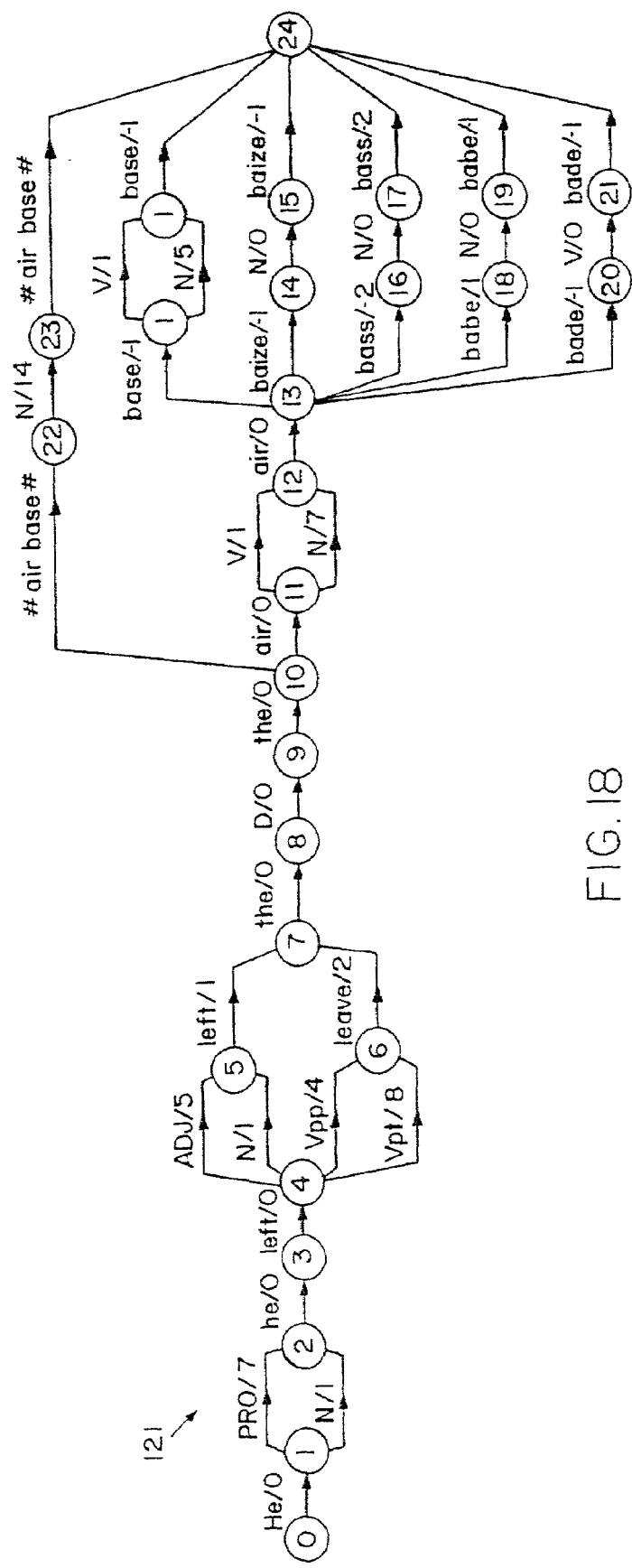
FIG. 18 shows an FST generated by the grammar application module in the contextual ranking module.

FIG. 18 is an example of FST 121 which was produced by grammar application module 117 from the FST shown in FIG. 16. As shown in FIG. 18, the weights on the path 125 corresponding to he left, where he is analyzed as a pronoun and left is analyzed as a verb in past tense, have been increased by weights application module 119. The weight for this path has been increased since it matches the subject-verb agreement rule, which indicates that a pronoun can be the subject of a verb. This and other rules are described in more detail below.

Construction of Grammar FST

Grammar FST 120 (see FIG. 17) is constructed from contextual grammatical rules, examples of which are set forth in Appendix A. In the present invention, there are two types of such rules: application rules and definition rules. Application rules indicate which rules must be applied, whereas definition rules define the rules themselves. Taking application rules first, application rules comprise items which do not contain an "equals" sign. For example, the application rule "*NP/0" indicates that a noun phrase rule (i.e., a rule stating that all nouns must be preceded by determiners, such as a, an, this, etc.) must be applied with a weight of 0. The weight of 0 means that, in the event that words in input FST 116 comply with this rule, a value of 0 is added to the weight of the matching words in input FST 116.

A "*" before an item in a rule, such as "*NP/0", indicates that the item is defined elsewhere by a definition rule. When there is no "*" before an item, the item refers to a word which can be specified with the word itself, its root form, and its part of speech. For example, the application rule there,Adv/10 is;be:V3sg/20 indicates that the word there should be matched as an adverb, followed immediately by the word be in the third person singular, i.e., is. If a match is found, meaning that words in input FST 116 comply with this rule, weights 10 and 20 are added to weights of the matching words in input FST 116.

Items to be matched by application rules can have any of the following formats:

| | |
|---|---|
| *SYMBOL./NUMBER | where SYMBOL is any symbol, and NUMBER is a weight; * indicates that the SYMBOL is defined elsewhere in the grammar. |
| WORD, POS/NUMBER | where WORD is a word, POS a part-of-speech, and NUMBER is a weight; the root form is not specified and matches any root form. |
| WORD; ROOT: POS/NUMBER | where WORD is a word, ROOT its root form, POS its part-of-speech, and NUMBER is a weight. |
| :POS/NUMBER | where POS is a part-of-speech and NUMBER a weight; in this item, the word and its root form are not specified and match any word and root form. |

Examples of some of the foregoing items are shown in the FST of FIG. 10.

Definition rules include an "equal" sign. The left side of the equal sign includes an item of the form "*SYMBOL"; and the right side of the equal sign includes any sequence of items. For example,

*NP3S=*ADJP/0 :N/10 is a definition rule. In this example, *NP3S indicates that a noun phrase in the third person singular is formed by an adjective (*ADJP/0) and a noun (:N/10). In a case that words in input FST comply with this rule, a noun in such words is incremented by 10 (from the 10 in ":N/10") and the adjective is not incremented (from the 0 in "*ADJP/0").

In the present invention, the grammatical rules are non-recursive, meaning that at no point does a symbol refer to itself. As a result, the rules can be combined into a grammar FST for comparison with input FST 116. Specifically, to generate grammar FST 120, items with a "*" preceding them are recursively replaced by their definitions. Next, the grammatical rules are converted into an FST by concatenating an FST of each obtained item. Application rules are then used to define paths from an initial state to a final state in the constructed FST.

In addition to general grammatical rules (such as subject-verb agreement rules), the present invention also includes specific grammatical constructions in the grammar FST. For example the application rule too,Adv/10,A/40 to,Prep/10 corresponds to the construction "too ADJECTIVE to", as in the sentence "He is too young to drive". Another example of such a construction is:

there,Adv/10 is;be:V3sg/20, which is used for sentences such as "There is a car in his parking space". Grammar FST 120 also includes auxiliary verb groups ("*VG"), examples of which are also shown in Appendix A.

Post-Grammar Application Module Processing

Figure 19:
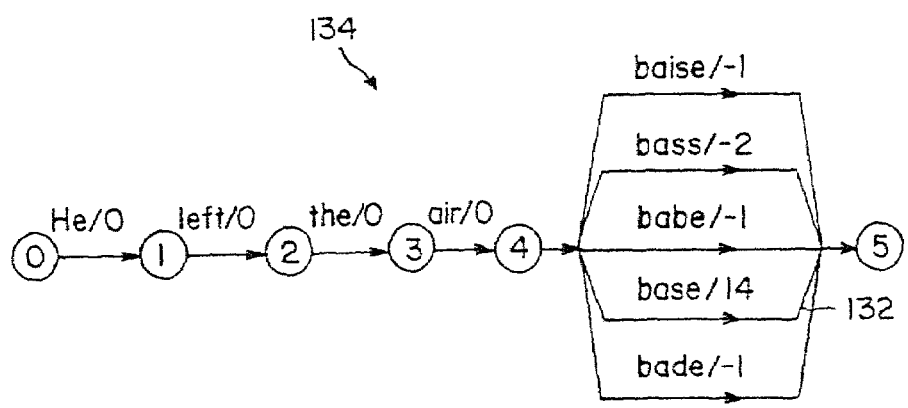
FIG. 19 shows an FST generated by a morphological deletion module of the present invention.

Returning to FIG. 13, FST 121 generated by grammar application module 117 (see, e.g., FIG. 18) is output to morphology deletion module 130. Morphology deletion module 130 deletes unnecessary morphological information from the FST, such as part-of-speech information. Morphology deletion module 130 also reorganizes weights in the FST so that the weights correspond to possible alternatives to a misspelled word. An example of such an FST is shown in FIG. 19, in which only words and weights remain. As shown in FIG. 19, base 132 has a weight of 14, since morphology deletion module 130 moved the weight of the compound "air base" to "base" (see FIG. 18). FST 134, having words and weights only, is then output from morphology deletion module 130 to best path enumeration module 135. Best path enumeration module 135 sums the weights of each path of FST 134, and outputs a ranked list 136 of alternative words that can be used to replace a misspelled word or a grammatically-incorrect word in the input text. In accordance with the invention, and particularly in cases where the invention is used in a non-English-language context, this list of alternative words may contain words having an accent mark and/or a diacritic which is different from, and/or missing from, the original word. In addition, in preferred embodiments of the invention, this ranked list ranks the alternative words according to which have the highest weights. Of course, in a case that weights are not used, or different types of weights are used, the ranking can be performed differently.

The spelling and grammar checking system of the present invention may be used in conjunction with a variety of different types of applications. Examples of such uses of the invention are provided in more detail below.

Word Processing

Figure 20:
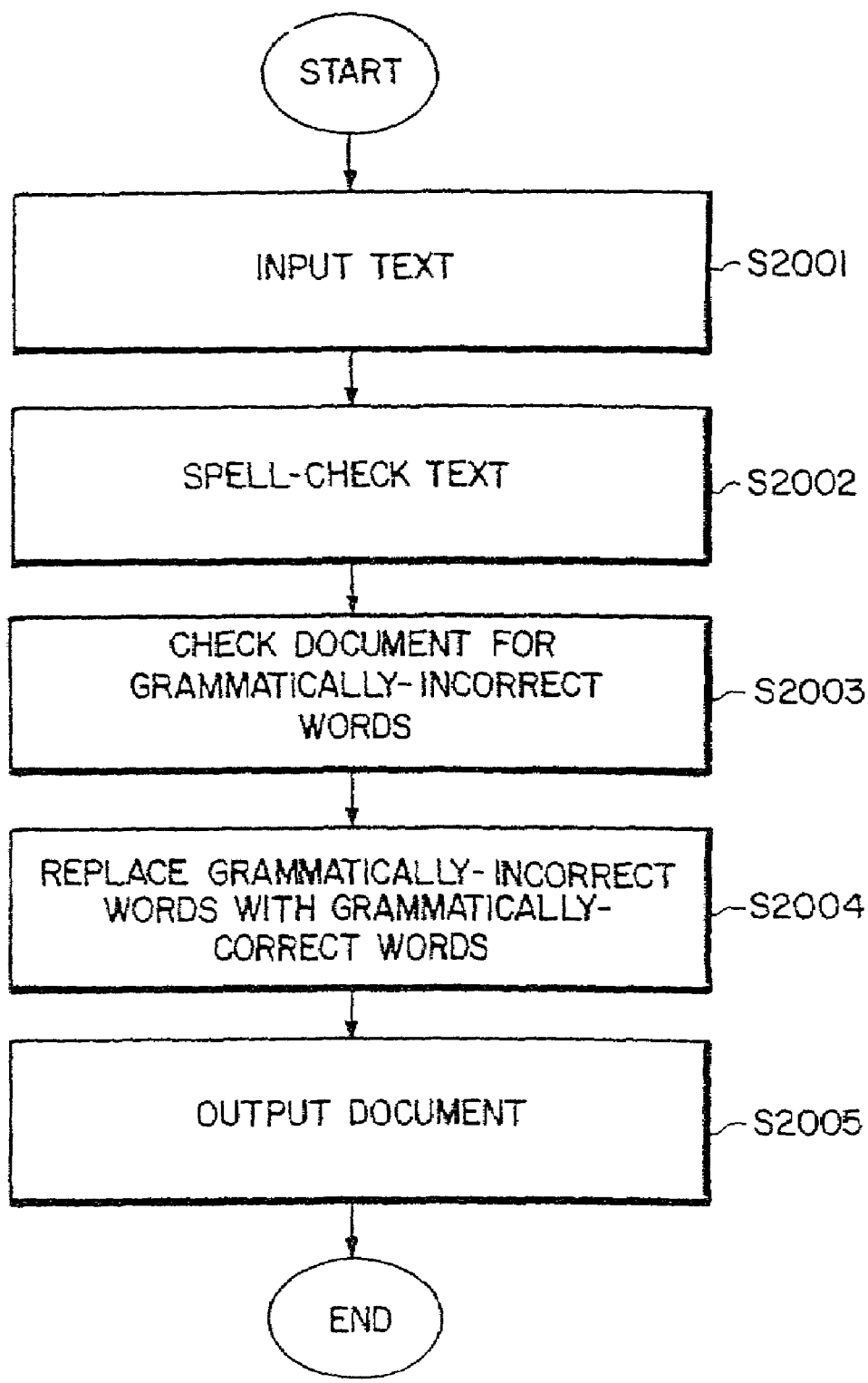
FIG. 20 shows process steps for a word processing system which includes the spelling and grammar checking system of the present invention.

Spelling and grammar checking code 49 of the present invention may be used in the context of a word processing application, such as those described above. FIG. 20 is a flow diagram depicting computer-executable process steps which are used in such a word processing application.

More specifically, step S2001 inputs text into a text document. Next, step S2002 spell-checks the text so as to replace misspelled words in the text with correctly-spelled words. In preferred embodiments of the invention, step S2002 is performed in accordance with FIG. 3 or 4 described above, and comprises detecting misspelled words in the text, and, for each misspelled word, determining a list of alternative words for the misspelled word, ranking the list of alternative words based on a context in the text, selecting one of the alternative words from the list, and replacing the misspelled word in the text with the selected one of the alternative words. Next, step S2003 checks the document for grammatically-incorrect words. In preferred embodiments of the invention, step S2003 checks the document by (i) generating a finite state machine ("FSM") for text in the text document, the finite state machine including alternative words for at least one word in the text and a rank associated with each alternative word, (ii) adjusting the ranks in the FSM in accordance with one or more of a plurality of predetermined grammatical rules, and (iii) determining which of the alternative words is grammatically correct based on ranks for the alternative words. Finally, step S2004 replaces grammatically-incorrect words in the document with grammatically-correct word, and step S2005 outputs the document with little or no grammatical and/or spelling errors.

Machine Translation

Figure 21:
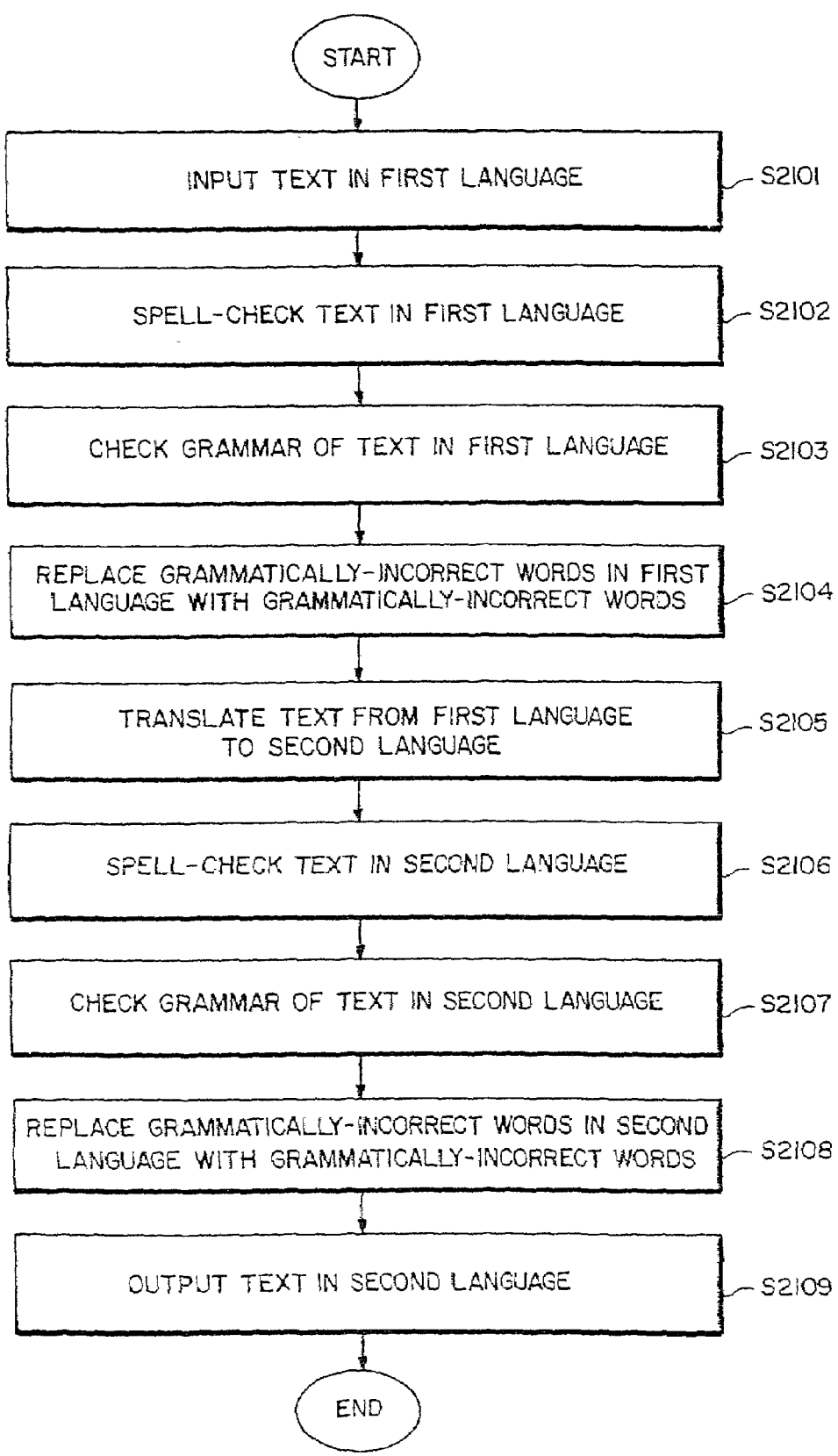
FIG. 21 shows process steps for a machine translation system which includes the spelling and grammar checking system of the present invention.

Spelling and grammar checking code 49 of the present invention may be used in the context of a machine translation system which translates documents from one language to another language, such as those described above. FIG. 21 is a flow diagram depicting computer-executable process steps which are used in such a machine translation system.

More specifically, step S2101 inputs text in a first language, and step S2102 spell-checks the text in the first language so as to replace misspelled words in the text with correctly-spelled words. In preferred embodiments of the invention, this spell-checking step is performed in accordance with FIG. 3 or 4 described above, and comprises detecting misspelled words in the text, and, for each misspelled word, determining a list of alternative words for the misspelled word, ranking the list of alternative words based on a context in the text, selecting one of the alternative words from the list, and replacing the misspelled word in the document with the selected one of the alternative words. Next, step S2103 checks the text in the first language for grammatically-incorrect words. Step S2103 does this by (i) generating a finite state machine ("FSM") for the text in the first language, the finite state machine including alternative words for at least one word in the text and a rank associated with each alternative word, (ii) adjusting the ranks in the FSM in accordance with one or more of a plurality of predetermined grammatical rules, and (iii) determining which of the alternative words is grammatically correct based on ranks for the alternative words. Grammatically-incorrect words in the text are then replaced with grammatically-correct words in step S2104.

Following step S2104, step S2105 translates the text from the first language into the second language, and step S2106 spell-checks the text in the second language so as to replace misspelled words in the text with correctly-spelled words. In preferred embodiments of the invention, step S2106 spell checks the text in the same manner as did step S2102. Accordingly, a detailed description of this process is not repeated. Thereafter, step S2107 checks the text in the second language for grammatically-incorrect words in the same manner that step S2103 checked the text in the first language. Accordingly, a detailed description of this process is not repeated. Step S2108 then replaces grammatically-incorrect words in the text with grammatically-correct words, and step S2109 outputs the text with little or no grammatical and/or spelling errors.

Optical Character Recognition

Figure 22:
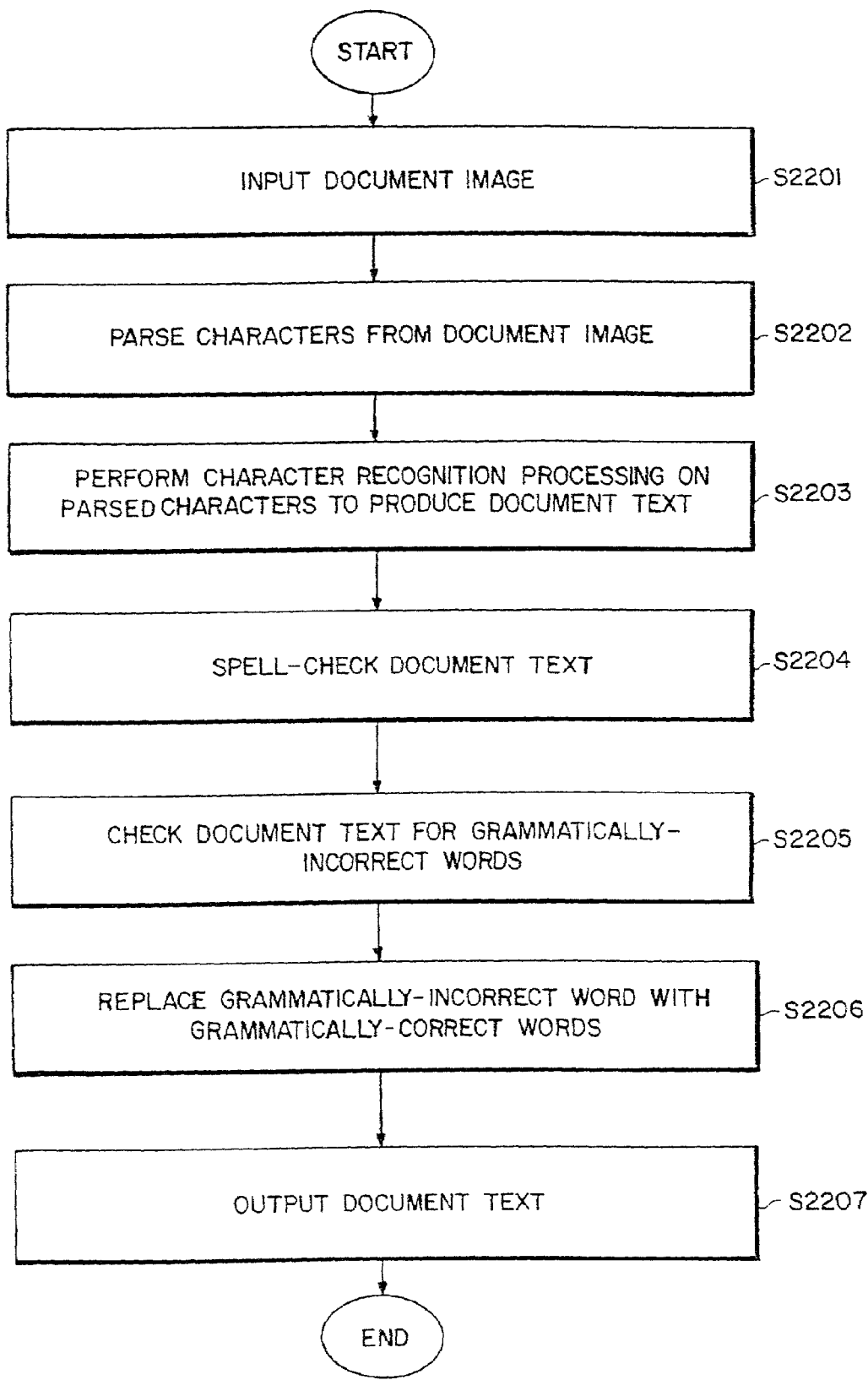
FIG. 22 shows process steps for an optical character recognition system which includes the spelling and grammar checking system of the present invention.

Spelling and grammar checking code 49 of the present invention may be used in the context of an optical character recognition system which recognizes input character images. FIG. 22 is a flow diagram depicting computer-executable process steps which are used in such an optical character recognition system.

More specifically, step S2201 inputs a document image, e.g., via scanner 13, and step S2202 parses character images from the document image. Thereafter, step S2203 performs character recognition processing on parsed character images so as to produce document text. Step S2204 then spell-checks the document text so as to replace misspelled words in the document text with correctly-spelled words. This spell checking is performed in accordance with FIG. 3 or 4 described above, and comprises detecting misspelled words in the document text, and, for each misspelled word, determining a list of alternative words for the misspelled word, ranking the list of alternative words based on a context in the text, selecting one of the alternative words from the list, and replacing the misspelled word in the document text with the selected one of the alternative words. Next, step S2205 checks the document text for grammatically-incorrect words. This checking is performed in accordance with FIG. 3 or 4 described above, and comprises (i) generating a finite state machine ("FSM") for the document text, the finite state machine including alternative words for at least one word in the text and a rank associated with each alternative word, (ii) adjusting the ranks in the FSM in accordance with one or more of a plurality of predetermined grammatical rules, and (iii) determining which of the alternative words is grammatically correct based on ranks associated for the alternative words. Thereafter, step S2206 replaces grammatically-incorrect words in the document text with grammatically correct words, and step S2207 outputs the document text with little or no grammatical and/or spelling errors.

Text Indexing and Retrieval

Figure 23:
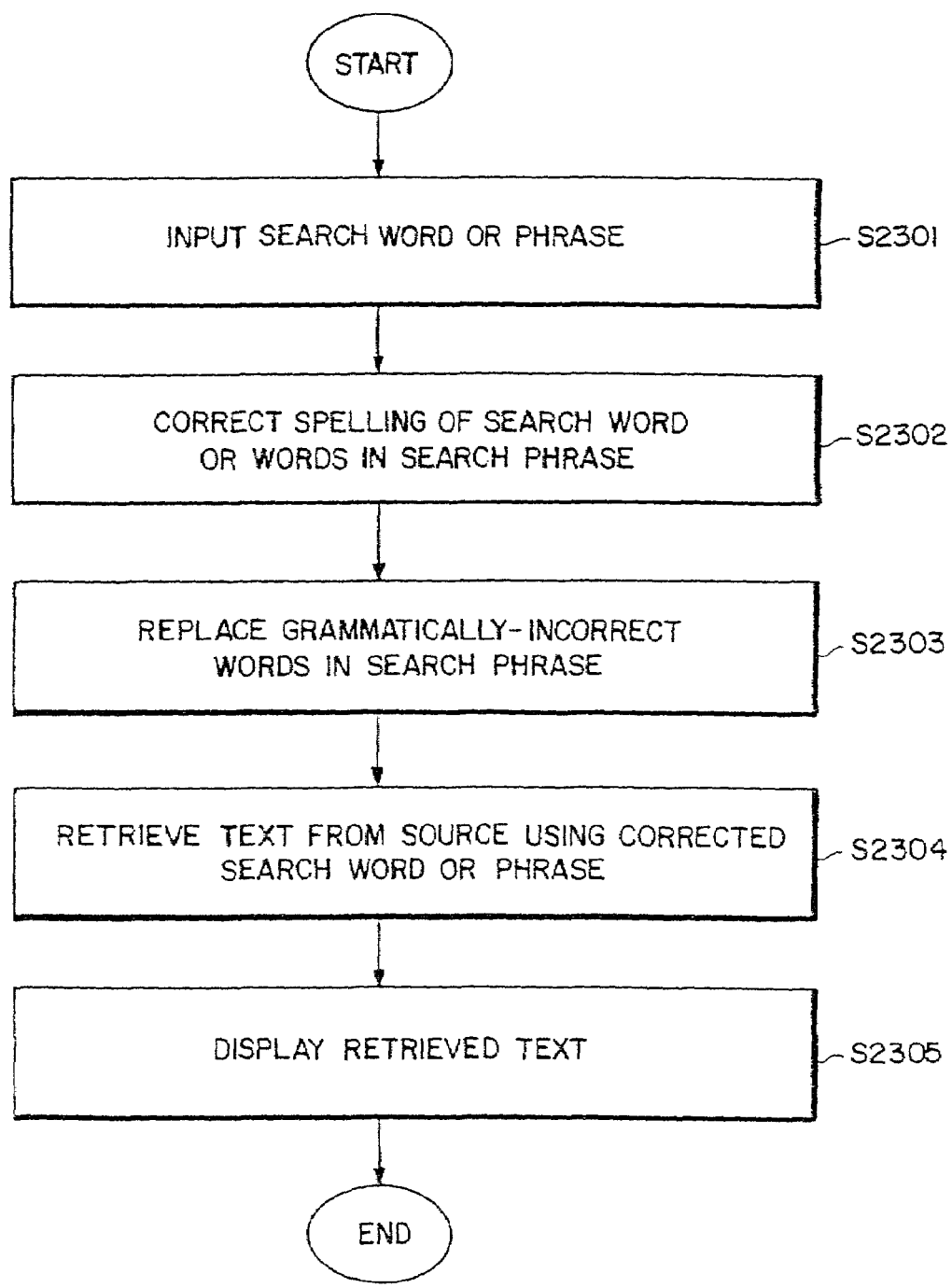
FIG. 23 shows process steps for a text indexing and retrieving system which includes the spelling and grammar checking system of the present invention.

Spelling and grammar checking code 49 of the present invention may be used in the context of a text indexing and retrieval system for retrieving text from a source based on an input search word. Examples of such text indexing and retrieving systems in which the present invention may be used include, but are not limited to, Internet search engines, document retrieval software, etc. FIG. 23 is a flow diagram depicting computer-executable process steps which are used in such a text indexing and retrieval system.

More specifically, step S2301 comprises inputting a search word or a search phrase comprised of plural search words, and step S2302 comprises correcting a spelling of each search word to produce corrected search word(s). Next, in a case that a search phrase is input, step S2303 replaces grammatically-incorrect words in the search phrase with a grammatically-correct word in order to produce a corrected search phrase. In the invention, steps S2302 and S2303 are preferably performed by spelling and grammar checking code 49 shown in FIG. 3 or 4. Step S2304 then retrieves text from a source (e.g., a pre-stored database or a remote location such as a URL on the WWW) that includes the corrected search word/phrase, and step S2305 displays the retrieved text on local display, such as display screen 11.

Client-Server Configuration

The spelling and grammar checking system of the present invention may also be utilized in a plurality of different hardware contexts. For example, the invention may be utilized in a client-server context. In this aspect of the invention, a single computer, such as PC 4, can service multiple requests for spelling correction at the same time by executing multiple threads of the same program, such as spelling suggestion module 52. To perform this function, in this embodiment of the invention, processor 38 is multitasking.

In brief, this aspect of the invention comprises computer-executable process steps to correct misspelled words in input text sequences received from a plurality of different clients. The process steps include code to store in a memory on a server (e.g., PC 4 shown in FIG. 1 or a stand-alone server), a lexicon comprised of a plurality of reference words, code to receive the input text sequences from the plurality of different clients (e.g., over fax/modem line 10, network interface 9, etc.), code to spell-check the input text sequences using the reference words in the lexicon, and code to output spell-checked text sequences to the plurality of different clients. In preferred embodiments of the invention, the lexicon comprises one or more lexicon FSTs (in general, FSMs), stored in a single memory, where the lexicon FSTs include the plurality of reference words and a phonetic representation each reference word. In these embodiments, the spell-checking code comprises a code to correct misspelled words in each of the input text sequences substantially in parallel using the lexicon FSTs stored in the single memory. This code corresponds to that described above in FIGS. 3 and 4.

Figure 24:
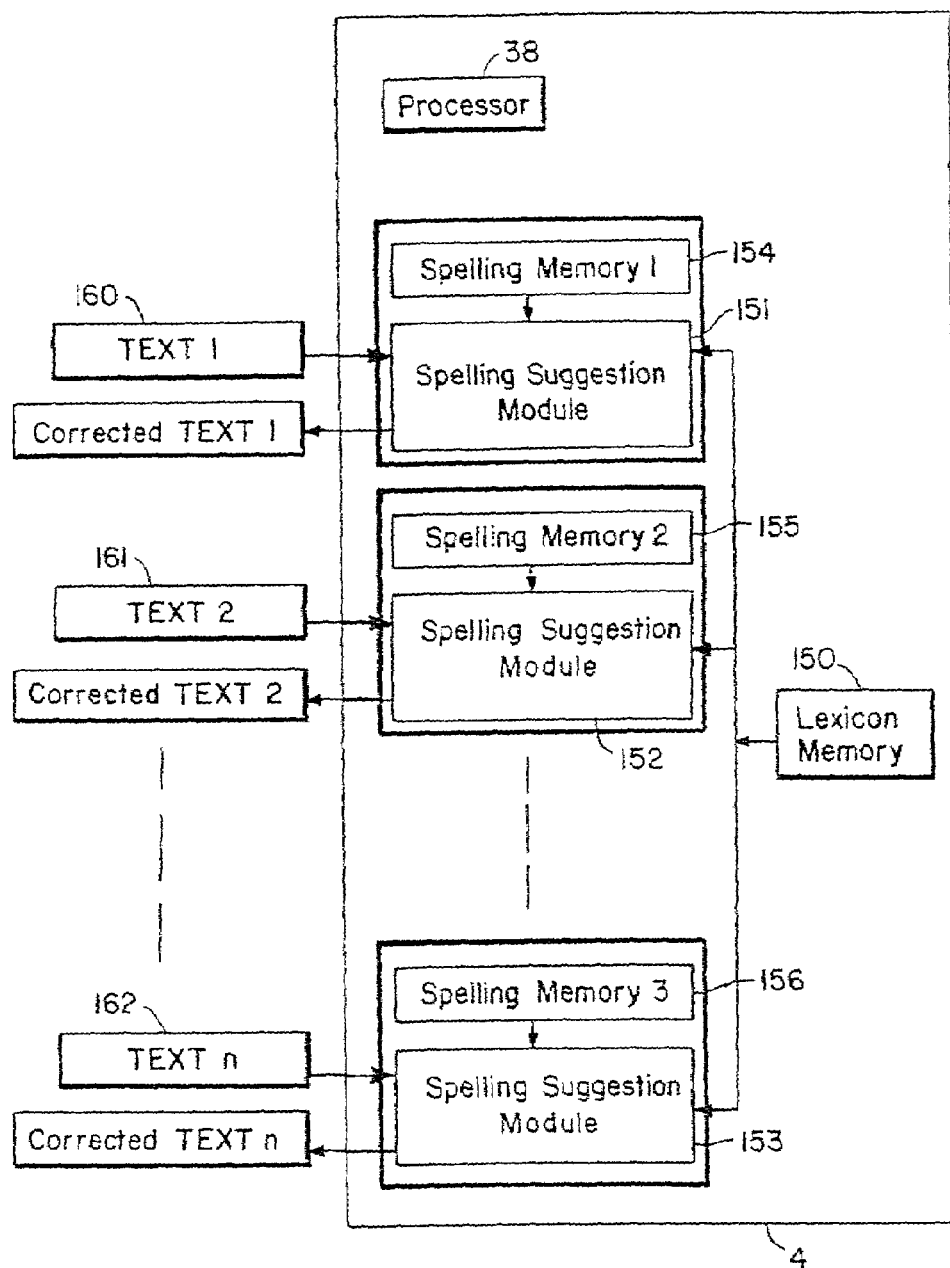
FIG. 24 shows a client-server architecture which implements the present invention.

FIG. 24 shows representative architecture of the client-server multi-threaded spelling correction system of the present invention. As shown in FIG. 24, lexicon memory 150 (which stores lexicon FSTs of the type described above) is shared across each program thread 151, 152 and 153 of the client-server spelling correction system. In this regard, each program thread comprises a substantially complete copy of spelling and grammar checking code 49.

Each of program threads 151 to 153 contains a corresponding memory (i.e., memories 154, 155 and 156) that is used by processor 38 to execute that thread, as well as to perform other processing in relation thereto. Each spelling memory also stores an FSA generated by spelling suggestion module 52 (see FIG. 5), and may also store additional programs and variables. Lexicon memory 150 is identical to a memory used to store the lexicon FSTs described with respect to FIG. 5, but, unlike that in FIG. 5, is being shared by plural program threads on the server. In operation, multiple text sequences (TEXT1 160, TEXT2 161 . . . TEXTn 162) from a plurality of different clients are input to the server from remote sources, such as a LAN, the Internet, a modem, or the like, and are processed by respective program threads. Specifically, each program thread identifies misspelled words in the text, and, using lexicon memory 150, outputs corrected text, as shown in FIG. 24. In this regard, the operation of the spelling and grammar checking code used in this aspect of the invention is identical to that described above, with the only difference being memory allocation.

Client-Server Information Retrieval System

Figure 25:
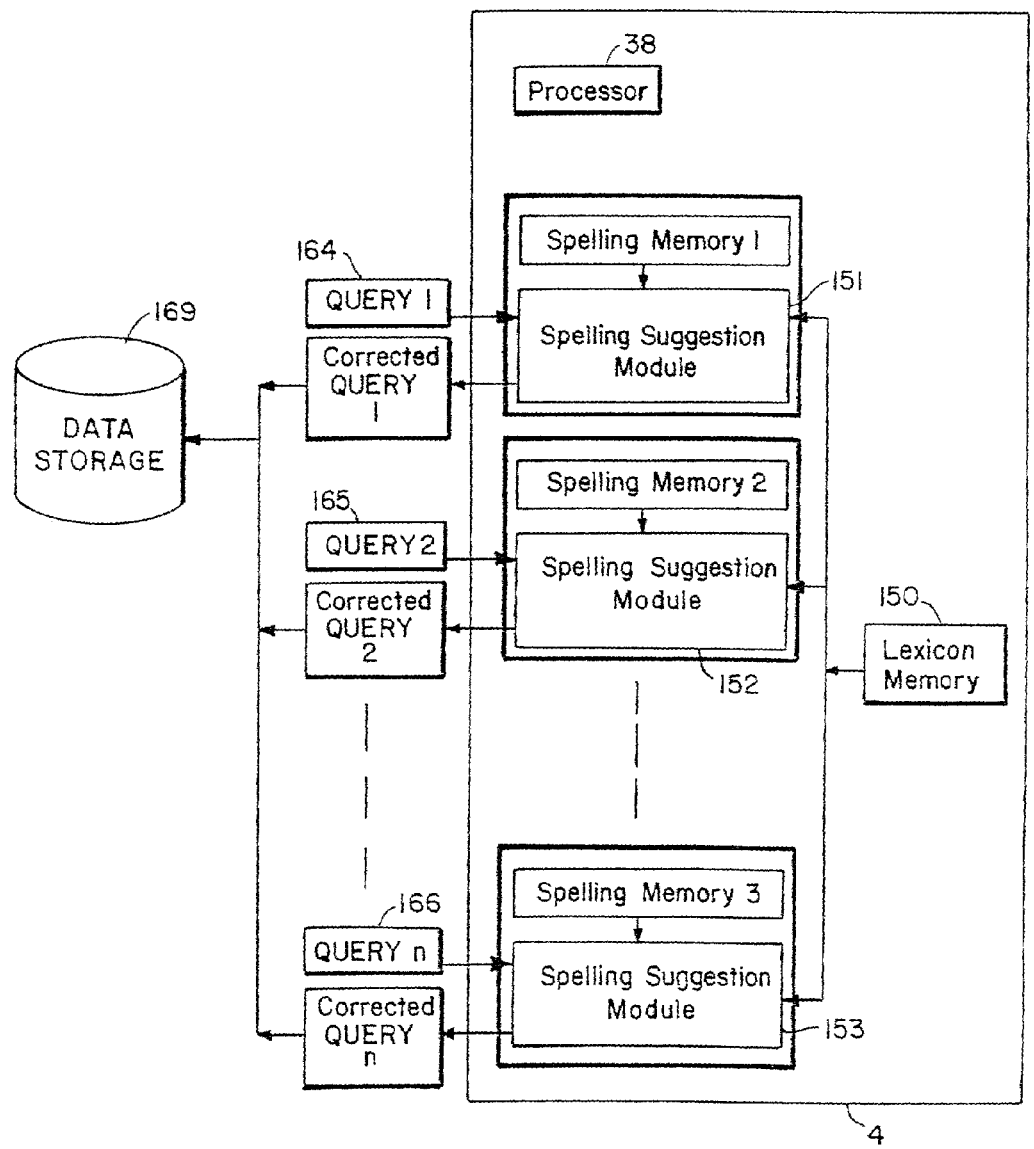
FIG. 25 shows a text indexing and retrieving system implemented using the architecture shown in FIG. 24.

FIG. 25 shows the multi-threaded client-server spelling correction system described above used in a text indexing and retrieval context (e.g., in conjunction with a WWW search engine, database searching software, etc.). In this regard, in text indexing and retrieving systems, textual queries are sent to a database, and information related to the textual queries is retrieved from the database. Often, however, queries are misspelled and, as a result, correct information cannot be retrieved from the database. The system shown in FIG. 25 addresses this problem.

More specifically, in FIG. 25, as was the case above with respect to FIG. 24, multiple queries are input at the same time to the server (i.e., PC 4). As was the case in FIG. 24, lexicon memory 750 is shared among all of program threads 151, 152 and 153. In addition, as before, each program thread contains its own spelling memory. In operation, multiple queries (i.e., QUERY1 164, QUERY2 165 . . . QUERYn 166) are input to the client-server spelling correction system of the present invention before each query is actually used to retrieve information from database 169. The present invention then corrects each query in the manner described above with respect to FIGS. 3, 4 and in particular, FIG. 5. Each corrected query is then used to retrieve information from database 169.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

We claim:

1. A computer implemented method of correcting a misspelled word in input text, the method comprising the steps of:

detecting a misspelled word in the input text, wherein the detecting comprises comparing each word in the input text to a dictionary database and characterizing a word as misspelled when the word does not match any words in the dictionary database;

determining a list of alternative words for the misspelled word; and ranking the list of alternative words based on a context of the input text, wherein the alternative words yield correct parts of speech sequences according to the context, wherein the ranking step comprises;

generating a first finite state machine ("FSM") for the input text, the first FSM having a plurality of arcs which include the alternative words and weights associated therewith, where a weight of each alternative word corresponds to a likelihood that the alternative word, taken out of grammatical context, comprises a correctly-spelled version of the misspelled word; and applying a second FSM to the first FSM wherein the second FSM encodes a set of grammatically correct sequences of words.

2. A computer implemented method of correcting a misspelled word in input text, a method comprising the steps of:

detecting a misspelled word in the input text, wherein the detecting comprises comparing each word in the input text to a dictionary database and characterizing a word as misspelled when the word does not match any word in the dictionary database;

determining a list of alternative words for the misspelled word; and ranking the list of alternative words based on a context of the input text, wherein the alternative words yield correct parts of speech sequences according to the context, wherein the list of alternative words includes a best alternative word, the method further comprising the step of replacing the misspelled word with the best alternative word, wherein the ranking step comprises:

generating a first finite state machine ("FSM") for the input text, the first FSM having a plurality of arcs which include the alternative words and weights associated therewith, where a weight of each alternative word corresponds to a likelihood that the alternative word, taken out of grammatical context, comprises a correctly-spelled version of a misspelled word; and applying a second FSM to the first FSM, wherein the second FSM encodes a set of grammatically correct sequences of words.

3. A computer implemented method of correcting a misspelled word in input text, the method comprising the steps of:
- detecting a misspelled word in the input text, wherein the detecting comprises comparing each word in the input text to a dictionary database and characterizing a word as misspelled when the word does not match any words in the dictionary database;
- determining a list of alternative words for the misspelled word; and
- ranking the list of alternative words based on a context of the input text, wherein the alternative words yield correct parts of speech sequences according to the context and further comprising the steps of:
- determining whether an alternative word is an element of a compound word or lexical phrase; and
- wherein the ranking step comprises modifying the rank of one or more of the alternative words if the alternative word is an element of a compound word or lexical phrase, wherein the ranking step comprises;
- generating a first finite state machine ("FSM") for the input text, the first FSM having a plurality of arcs which include the alternative words and weights associated therewith, where a weight of each alternative word corresponds to a likelihood that the alternative word, taken out of grammatical context, comprises a correctly-spelled version of the misspelled word, and
- applying a second FSM to the first FSM wherein the second FSM encodes a set of grammatically correct sequences of words.

4. The method of any of claims 1, 2 or 3 wherein the applying step comprises generating a third FSM.

5. The method of claim 4 wherein the applying step comprises modifying the first FSM.

6. A computer implemented method of correcting misspelled words in input text sequences received from a plurality of different clients, the method comprising the steps of:
- storing, in a memory on a server, a single shared lexicon comprised of a plurality of reference words;
- receiving the input text sequences from the plurality of different clients;
- spell-checking the input text sequences using the reference words in the single shared lexicon; and
- outputting spell-checked text sequences to the plurality of different clients, wherein the single shared lexicon comprises one or more lexicon finite state machines ("FSM"), each of the lexicon FSMs representing plural reference words, wherein a representation of a reference word comprises one or more states and one or more arcs, each arc comprising a character in the reference word; and
- wherein the spell-checking step comprises a correcting step for correcting misspelled words in each of the input text sequences substantially in parallel using the single shared lexicon comprised of one or more lexicon FSMs, wherein, for each text sequence, the correcting step comprises:
- generating an additional FSM comprising a plurality of states, each state including information identifying a state of a lexicon FSM and a position in the input word and a cost, wherein the cost is used to select states of the additional FSM that are to be expanded;
- selecting one or more reference words from the lexicon FSMs based on the additional FSM; and
- replacing the misspelled word in the text sequence with a selected one of the one or more reference words.

7. A computer implemented method of correcting misspelled words in input text sequences received from a plurality of different clients, the method comprising the steps of:
- storing, in a memory on a server, a single shared lexicon comprised of a plurality of reference words;
- receiving the input text sequences from the plurality of different clients;
- spell-checking the input text sequences using the reference words in the single shared lexicon; and
- outputting spell-checked text sequences to the plurality of different clients, wherein the single shared lexicon comprises one or more lexicon finite state machines ("FSM"), each of the lexicon FSMs representing plural reference words, wherein a representation of a reference word comprises one or more states and one or more arcs, each arc comprising a character in the reference word; and
- wherein the spell-checking step comprises a correcting step for correcting misspelled words at each of the input text sequences substantially in parallel using the single shared lexicon comprised of one or more lexicon FSMs, further comprising the step of:
- generating an FSM for a misspelled word in the text sequence, wherein the input FSM comprises one or more states and one or more arcs, each arc comprising a character in the reference word.

8. A computer implemented method of correcting misspelled words in input text sequences received from a plurality of different clients, the method comprising the steps of:
- storing, in a memory on a sewer, a single shared lexicon comprised of a plurality of reference words;
- receiving the input text sequences from the plurality of different clients;
- spell-checking the input text sequences using the reference words in the single shared lexicon; and
- outputting spell-checked text sequences to the plurality of different clients, wherein the single shared lexicon comprises one or more lexicon finite state machines ("FSM"), each of the lexicon FSMs representing plural reference words, wherein a representation of a reference word comprises one or more states and one or more arcs, each arc comprising a character in the reference word; and
- wherein the spell-checking step comprises a correcting step for correcting misspelled words in each of the input text sequences substantially in parallel using the single shared lexicon comprised of one or more lexicon FSMs, farther comprising the step of:
- generating an input FSM for a misspelled word in the text sequence, wherein the input FSM comprises one or more states and one or more arcs, each arc comprising a pair of characters, one of which is a character in the reference word and the other of which is a phonetic representation thereof.

* * * * *